(12) United States Patent  
Fujisaki et al.

(10) Patent No.: US 8,745,619 B2  
(45) Date of Patent: Jun. 3, 2014

(54) COMPUTER SYSTEM AND RECORDING MEDIUM

(75) Inventors: Naoya Fujisaki, Kawasaki (JP); Noboru Iwamatsu, Kawasaki (JP); Masahide Noda, Kawasaki (JP); Masatomo Yasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 425 days.

(21) Appl. No.: 13/064,660

(22) Filed: Apr. 6, 2011

(65) Prior Publication Data

US 2012/0011505 A1    Jan. 12, 2012

(30) Foreign Application Priority Data

Jul. 6, 2010   (JP) ................................. 2010-153811

(51) Int. Cl.
   *G06F 9/455*     (2006.01)
   *G06F 9/44*      (2006.01)
(52) U.S. Cl.
   CPC .......... *G06F 9/45533* (2013.01); *G06F 9/4411* (2013.01)
   USPC .............................................. 718/1; 719/322
(58) Field of Classification Search
   CPC ........................... G06F 9/45533; G06F 9/4411
   USPC .............................................. 718/1; 719/322
   See application file for complete search history.

(56) References Cited

U.S. PATENT DOCUMENTS

| 7,813,366 B2 * | 10/2010 | Freimuth et al. ............... 370/419 |
| 2008/0005297 A1 * | 1/2008 | Kjos et al. ..................... 709/223 |
| 2009/0133016 A1 * | 5/2009 | Brown et al. ..................... 718/1 |
| 2011/0179414 A1 * | 7/2011 | Goggin et al. ................... 718/1 |

FOREIGN PATENT DOCUMENTS

| JP | 58-020538 | 2/1983 |
| JP | 08-329315 | 12/1996 |

* cited by examiner

*Primary Examiner* — Camquy Truong  
(74) *Attorney, Agent, or Firm* — Staas & Halsey LLP

(57) ABSTRACT

A disclosed computer system having a virtual computer management mechanism realizing a virtual computer includes a user virtual computer that communicates with a device via a virtual computer for a device driver under a control of the virtual computer management mechanism, an input receiving unit that receives a signal of an input operation from the device, a reset level determination unit that determines a reset level based on the received signal of the input operation, a reset target specifying unit that specifies a virtual computer to be a target of a reset process based on the determined reset level, and a reset signal transmission unit that transmits a reset signal to perform the reset process on the specified virtual computer.

15 Claims, 42 Drawing Sheets

FIG.2

RESET MANAGEMENT INFORMATION 19

| OPERATION TARGET VM | RESET LEVEL | RESET PROCESS TARGET VM | | |
|---|---|---|---|---|
| GUEST a | 1 | GUEST a | | ... |
| | 2 | DRIVER a | DRIVER b | ... |
| | 3 | GUEST b | | ... |
| GUEST b | 1 | GUEST b | | ... |
| | 2 | DRIVER a | DRIVER b | ... |
| | 3 | GUEST a | | ... |
| ... | ... | ... | | ... |

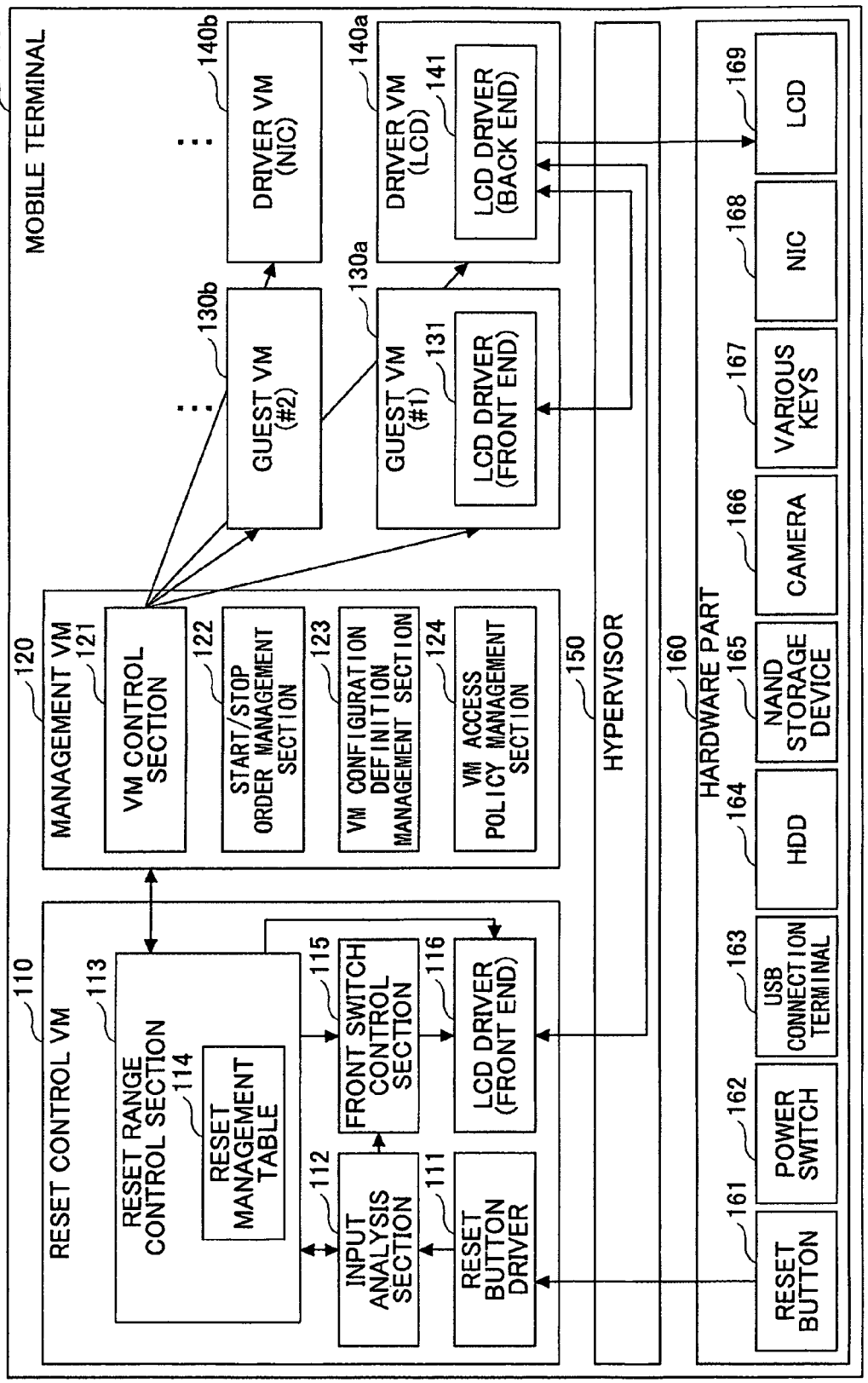

FIG.5A

VM START/STOP ORDER INFORMATION ~126 memload (START ADDRESS OF AREA STORING FIRST VM) ("FILE NAME OF VM")
memload (START ADDRESS OF AREA STORING SECOND VM) ("FILE NAME OF VM")
memload (START ADDRESS OF AREA STORING THIRD VM) ("FILE NAME OF VM")
...

FIG.5B

VM START/STOP ORDER INFORMATION ~126 memload 0x81c00000 "/somewhere/managerdom/lcd-dev-vm"
memload 0x81c00000 "/somewhere/managerdom/nic-dev-vm"
memload 0x81d00000 "/somewhere/managerdom/guest#1-vm"
memload 0x81e00000 "/somewhere/managerdom/guest#2-vm"
memload 0x82000000 "/somewhere/managerdom/reset-ctl-vm"
...

FIG.6A

VM CONFIGURATION DEFINITION INFORMATION ⟋127

VM-ID OF FIRST VM; VM TYPE; NUMBER OF VIRTUAL CPU; VIRTUAL MEMORY SIZE; VIRTUAL DISK SIZE;
VM-ID OF SECOND VM; VM TYPE; NUMBER OF VIRTUAL CPU; VIRTUAL MEMORY SIZE; VIRTUAL DISK SIZE;
VM-ID OF THIRD VM; VM TYPE; NUMBER OF VIRTUAL CPU; VIRTUAL MEMORY SIZE; VIRTUAL DISK SIZE;
. . .

FIG.6B

VM CONFIGURATION DEFINITION INFORMATION ⟋127 lcd-dev-vm; dev; 1; 4KB; 0;
nic-dev-vm; dev; 1; 512KB; 0;
guest#1-vm; guest; 2; 128MB; 512MB;
guest#2-vm; guest; 2; 256MB; 1GB;
reset-ctl-vm; ctl; 1; 1MB; 8MB;
. . .

FIG.7

VM ACCESS POLICY INFORMATION ~128

| VM-ID (VM NAME) | | VM OF ACCESS DESTINATION | | | | | |
|---|---|---|---|---|---|---|---|
| | | (MANAGEMENT VM) | lcd-dev-vm | nic-dev-vm | guest#1-vm | guest#2-vm | reset-ctl-vm |
| VM OF ACCESS SOURCE | (MANAGEMENT VM) | | -/-/x | -/-/x | -/-/x | -/-/x | r/w/x |
| | lcd-dev-vm | -/-/- | | -/-/- | r/w/- | r/w/- | r/w/- |
| | nic-dev-vm | -/-/- | -/-/- | | r/w/- | r/w/- | -/-/- |
| | guest#1-vm | -/-/- | r/w/- | r/w/- | | r/w/- | -/-/- |
| | guest#2-vm | -/-/- | r/w/- | r/w/- | -/-/- | | -/-/- |
| | reset-ctl-vm | r/w/- | r/w/- | -/-/- | -/-/- | -/-/- | |

FIG.8A

RESET MANAGEMENT TABLE — 114

| OPERATION TARGET VM (VM-ID) | RESET LEVEL | RESET PROCESS TARGET VM (DATA ARRANGEMENT) | | |
|---|---|---|---|---|
| guest#1-vm | 1 | DATA* | DATA* | ⋮ |
| | 2 | DATA* | DATA* | ⋮ |
| | 3 | DATA* | DATA* | ⋮ |
| guest#2-vm | 1 | DATA* | DATA* | ⋮ |
| | 2 | DATA* | DATA* | ⋮ |
| | 3 | DATA* | DATA* | ⋮ |
| ... | ... | ... | ... | ... |

STRUCTURE OF DATA*

| ITEMS | EXAMPLE OF DATA |
|---|---|
| VM-ID | lcd-dev-vm, . . . |
| NUMBER OF SHARING | 0, 1, 2, . . . |
| START/STOP STATE | 0/1 |

FIG.10A

RESET CONTROL POLICY (1)

| RESET BUTTON PRESS TIME | RESET LEVEL | RESET RANGE |
|---|---|---|
| SHORT | 1 | • GUEST VM OF OPERATION TARGET |
| MIDDLE | 2 | • DRIVER VM USED BY GUEST VM OF OPERATION TARGET |
| LONG | 3 | • GUEST VM SHARING DRIVER VM USED BY GUEST VM OF OPERATION TARGET |

FIG.10B

RESET CONTROL POLICY (2)

| RESET BUTTON PRESS TIME | RESET LEVEL | RESET RANGE |
|---|---|---|
| SHORT | 1 | • GUEST VM OF OPERATION TARGET |
| MIDDLE | 2 | • DRIVER VM USED ONLY BY GUEST VM OF OPERATION TARGET |
| LONG | 3 | • DRIVER VM SHARED BY GUEST VM OF OPERATION TARGET AND OTHER GUEST<br>• GUEST VM SHARING DRIVER VM USED BY GUEST VM OF OPERATION TARGET<br>• DRIVER VM USED BY GUEST VM SHARING DRIVER VM USED BY GUEST VM OF OPERATION TARGET |

FIG.11A

TEMPORARY RESET MANAGEMENT TABLE (VM-ID=guest#1-vm) ~114a'

| RESET LEVEL | ITEMS | RESET PROCESS TARGET VM | |
|---|---|---|---|
| | | DATA | |
| 1 | VM-ID | guest#1-vm | |
| | NUMBER OF SHARING | 0 | |
| | START/STOP STATE | 0 | |
| 2 | VM-ID | lcd-dev-vm | nic-dev-vm |
| | NUMBER OF SHARING | 2 | 1 |
| | START/STOP STATE | 0 | 0 |
| 3 | VM-ID | guest#2-vm | |
| | NUMBER OF SHARING | 0 | |
| | START/STOP STATE | 0 | |

FIG.11B

TEMPORARY RESET MANAGEMENT TABLE (VM-ID=guest#2-vm) 114b'

| RESET LEVEL | ITEMS | RESET PROCESS TARGET VM | |
|---|---|---|---|
| | | DATA | |
| 1 | VM-ID | guest#2-vm | |
| | NUMBER OF SHARING | 0 | |
| | START/STOP STATE | 0 | |
| 2 | VM-ID | lcd-dev-vm | |
| | NUMBER OF SHARING | 2 | |
| | START/STOP STATE | 0 | |
| 3 | VM-ID | guest#1-vm | |
| | NUMBER OF SHARING | 0 | |
| | START/STOP STATE | 0 | |

FIG.12A

RESET MANAGEMENT TABLE (1) (VM-ID=guest#1-vm) ~114a

| RESET LEVEL | ITEMS | RESET PROCESS TARGET VM | DATA |
|---|---|---|---|
| 1 | VM-ID | guest#1-vm | |
| | NUMBER OF SHARING | 0 | |
| | START/STOP STATE | 1 | |
| 2 | VM-ID | lcd-dev-vm | nic-dev-vm |
| | NUMBER OF SHARING | 2 | 1 |
| | START/STOP STATE | 1 | 1 |
| 3 | VM-ID | guest#2-vm | |
| | NUMBER OF SHARING | 0 | |
| | START/STOP STATE | 1 | |

FIG.12B

RESET MANAGEMENT TABLE (1) (VM-ID=guest#2-vm) 114b

| RESET LEVEL | ITEMS | RESET PROCESS TARGET VM | |
|---|---|---|---|
| | | DATA | |
| 1 | VM-ID | guest#2-vm | |
| | NUMBER OF SHARING | 0 | |
| | START/STOP STATE | 1 | |
| 2 | VM-ID | lcd-dev-vm | |
| | NUMBER OF SHARING | 2 | |
| | START/STOP STATE | 1 | |
| 3 | VM-ID | guest#1-vm | |
| | NUMBER OF SHARING | 0 | |
| | START/STOP STATE | 1 | |

FIG.13A

RESET MANAGEMENT TABLE (1) (VM-ID=guest#1-vm) ~114c

| RESET LEVEL | ITEMS | RESET PROCESS TARGET VM | DATA |
|---|---|---|---|
| 1 | VM-ID | guest#1-vm | |
| | NUMBER OF SHARING | 0 | |
| | START/STOP STATE | 1 | |
| 2 | VM-ID | nic-dev-vm | |
| | NUMBER OF SHARING | 1 | |
| | START/STOP STATE | 1 | |
| 3 | VM-ID | lcd-dev-vm | guest#2-vm |
| | NUMBER OF SHARING | 2 | 0 |
| | START/STOP STATE | 1 | 1 |

FIG.13B

RESET MANAGEMENT TABLE (1) (VM-ID=guest#2-vm)    114d

| RESET LEVEL | ITEMS | RESET PROCESS TARGET VM | | |
|---|---|---|---|---|
| | | DATA | | |
| 1 | VM-ID | guest#2-vm | | |
| | NUMBER OF SHARING | 0 | | |
| | START/STOP STATE | 1 | | |
| 2 | VM-ID | lcd-dev-vm | guest#1-vm | nic-dev-vm |
| | NUMBER OF SHARING | 2 | 0 | 1 |
| | START/STOP STATE | 1 | 1 | 1 |
| 3 | VM-ID | | | |
| | NUMBER OF SHARING | | | |
| | START/STOP STATE | | | |

FIG.19

RESET MANAGEMENT TABLE (OPERATION TARGET VM=GUEST VM (#1)) ~114e

| RESET LEVEL | RESET PROCESS TARGET VM | | |
|---|---|---|---|
| 1 | GUEST VM (#1) | | |
| 2 | DRIVER VM (HDD) | DRIVER VM (NIC) | DRIVER VM (LCD) |
| 3 | DRIVER VM (USB) | | |

FIG.22A

RESET MANAGEMENT TABLE (OPERATION TARGET VM=GUEST VM (#1))  ~114f

| RESET LEVEL | RESET PROCESS TARGET VM |
|---|---|
| 1 | GUEST VM (#1) |
| 2 | DRIVER VM (HDD) |
| 3 | DRIVER VM (USB) |

FIG.22B

RESET MANAGEMENT TABLE (OPERATION TARGET VM=GUEST VM (#2))  ~114g

| RESET LEVEL | RESET PROCESS TARGET VM |
|---|---|
| 1 | GUEST VM (#2) |
| 2 | DRIVER VM (NIC) |
| 3 | DRIVER VM (LCD) |

FIG.25A

RESET MANAGEMENT TABLE (1) (OPERATION TARGET VM=GUEST VM (#1))  114h

| RESET LEVEL | RESET PROCESS TARGET VM | | |
|---|---|---|---|
| 1 | GUEST VM (#1) | | |
| 2 | DRIVER VM (HDD) | DRIVER VM (NIC) | DRIVER VM (LCD) |
| 3 | DRIVER VM (USB) | GUEST VM (#2) | |

FIG.25B

RESET MANAGEMENT TABLE (1) (OPERATION TARGET VM=GUEST VM (#2)) ~114i

| RESET LEVEL | RESET PROCESS TARGET VM | |
|---|---|---|
| 1 | GUEST VM (#2) | |
| 2 | DRIVER VM (NIC) | DRIVER VM (LCD) |
| 3 | GUEST VM (#1) | |

FIG.26A

RESET MANAGEMENT TABLE (2) (OPERATION TARGET VM=GUEST VM (#1)) — 114j

| RESET LEVEL | RESET PROCESS TARGET VM | | |
|---|---|---|---|
| 1 | GUEST VM (#1) | | |
| 2 | DRIVER VM (HDD) | | |
| 3 | DRIVER VM (USB) | DRIVER VM (NIC) | DRIVER VM (LCD) |
| | GUEST VM (#2) | | |

FIG.26B

RESET MANAGEMENT TABLE (2) (OPERATION TARGET VM=GUEST VM (#2))  ~114k

| RESET LEVEL | RESET PROCESS TARGET VM | | |
|---|---|---|---|
| 1 | GUEST VM (#2) | | |
| 2 | | | |
| 3 | DRIVER VM (NIC) | DRIVER VM (LCD) | GUEST VM (#1) |
| | DRIVER VM (HDD) | DRIVER VM (USB) | |

FIG.29A

RESET MANAGEMENT TABLE (1) (OPERATION TARGET VM=GUEST VM (#1))  ~114l

| RESET LEVEL | RESET PROCESS TARGET VM | | |
|---|---|---|---|
| 1 | GUEST VM (#1) | | |
| 2 | DRIVER VM (HDD) | DRIVER VM (NIC) | DRIVER VM (LCD) |
| 3 | DRIVER VM (USB) | GUEST VM (#2) | GUEST VM (#3) |

FIG.29B

RESET MANAGEMENT TABLE (1) (OPERATION TARGET VM=GUEST VM (#2)) ~114m

| RESET LEVEL | RESET PROCESS TARGET VM |
|---|---|
| 1 | GUEST VM (#2) |
| 2 | DRIVER VM (NIC) |
| 2 | DRIVER VM (LCD) |
| 3 | GUEST VM (#1) |
| 3 | GUEST VM (#3) |

FIG.29C

RESET MANAGEMENT TABLE (1) (OPERATION TARGET VM=GUEST VM (#3))  114n

| RESET LEVEL | RESET PROCESS TARGET VM |
|---|---|
| 1 | GUEST VM (#3) |
| 2 | DRIVER VM (LCD) |
| 3 | GUEST VM (#1) |
| | GUEST VM (#2) |

FIG.30A

RESET MANAGEMENT TABLE (2) (OPERATION TARGET VM=GUEST VM (#1))    114o

| RESET LEVEL | RESET PROCESS TARGET VM | | |
|---|---|---|---|
| 1 | GUEST VM (#1) | | |
| 2 | DRIVER VM (HDD) | DRIVER VM (NIC) | |
| 3 | DRIVER VM (USB) | GUEST VM (#3) | DRIVER VM (LCD) |
|   | GUEST VM (#2) | | |

FIG.30B

RESET MANAGEMENT TABLE (2) (OPERATION TARGET VM=GUEST VM (#2))  114p

| RESET LEVEL | RESET PROCESS TARGET VM | | |
|---|---|---|---|
| 1 | GUEST VM (#2) | | |
| 2 | DRIVER VM (NIC) | DRIVER VM (LCD) | GUEST VM (#1) |
| 3 | GUEST VM (#3) | DRIVER VM (HDD) | DRIVER VM (USB) |

FIG.30C

RESET MANAGEMENT TABLE (2) (OPERATION TARGET VM=GUEST VM (#3))  ~114q

| RESET LEVEL | RESET PROCESS TARGET VM | | |
|---|---|---|---|
| 1 | GUEST VM (#3) | | |
| 2 | | | |
| 3 | DRIVER VM (LCD) | GUEST VM (#1) | GUEST VM (#2) |
|   | DRIVER VM (NIC) | DRIVER VM (HDD) | DRIVER VM (USB) |

RESET
GUEST VM OF #1

RESET
xxxx MODE IN USE

RESET
GUEST VM OF #1 AND
DRIVER VM OF HDD

RESET
xxxx MODE IN USE AND
DEVICE IN USE

RESET
GUEST VM OF #1,
DRIVER VM OF HDD,
DRIVER VMs OF USB, NIC,
AND LCD, AND
GUEST VMs OF #2 AND #3

RESET
xxxx MODE IN USE,
DEVICE (INCLUDING
CONNECTION TERMINAL)
IN USE, AND
SHARED SYSTEM IN USE

COMPUTER SYSTEM AND RECORDING MEDIUM

CROSS-REFERENCE TO RELATED APPLICATIONS

This application is based upon and claims the benefit of priority of Japanese Patent Application No. 2010-153811, filed Jul. 6, 2010. The entire contents of which are incorporated herein by reference.

FIELD

The embodiment discussed herein is related to a computer system.

BACKGROUND

Japanese Laid-Open Patent Application No. 58-20538 discloses a technique in which a user may select an operation from among various operations using a single key depending on the pressing (operating) time period of pressing the single key.

Japanese Laid-Open Patent Application No. 08-329315 discloses a guidance control method including, when a user presses a key on a guidance screen, measuring a time period of pressing the key, determining a type of reaction sound, a method of switching the guidance screen, and contents and speed of audio guidance and the like based on the measured time period.

SUMMARY

According to an aspect of the present invention, there is provided a computer system having a virtual computer management mechanism realizing a virtual computer. The computer system includes a user virtual computer communicating with a device via a virtual computer for a device driver under control of the virtual computer management mechanism; an input receiving unit that receives a signal of an input operation from a device; a reset level determination unit that determines a reset level based on the received signal of the input operation; a reset target specifying unit that specifies a virtual computer to be a target of a reset process based on the determined reset level; and a reset signal transmission unit that transmits a reset signal to perform the reset process on the specified virtual computer.

The object and advantages of the disclosure will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates an example of reset management information according to an embodiment of the present invention;

FIG. 4 is an example configuration of a portable terminal according to an embodiment of the present invention;

FIGS. 5A and 5B illustrate examples of VM (Virtual Machine) start/stop order information according to an embodiment of the present invention;

FIGS. 6A and 6B illustrate examples of VM configuration definition information according to an embodiment of the present invention;

FIG. 7 illustrates an example of VM access policy information according to an embodiment of the present invention;

FIGS. 8A and 8B illustrate examples of the configuration of a reset management table according to an embodiment of the present invention;

FIG. 9 is an example configuration of the VMs according to an embodiment of the present invention;

FIGS. 10A and 10B illustrates examples of reset control policies according to an embodiment of the present invention;

FIGS. 11A and 11B illustrate examples of temporary reset management tables;

FIGS. 12A and 12B illustrate examples of completed reset management tables;

FIGS. 13A and 13B illustrate other examples of completed reset management tables;

FIG. 19 illustrates an example reset management table according to the first embodiment of the present invention;

FIGS. 22A and 22B illustrate example reset management tables according to the second embodiment of the present invention;

FIGS. 25A and 25B illustrate example reset management tables according to the third embodiment of the present invention;

FIGS. 26A and 26B illustrate another example of reset management tables according to the third embodiment of the present invention;

FIGS. 29A through 29C illustrate example reset management tables according to the fourth embodiment of the present invention;

FIGS. 30A through 30C illustrate example reset management tables according to the fourth embodiment of the present invention.

DESCRIPTION OF EMBODIMENT

Figure 1:
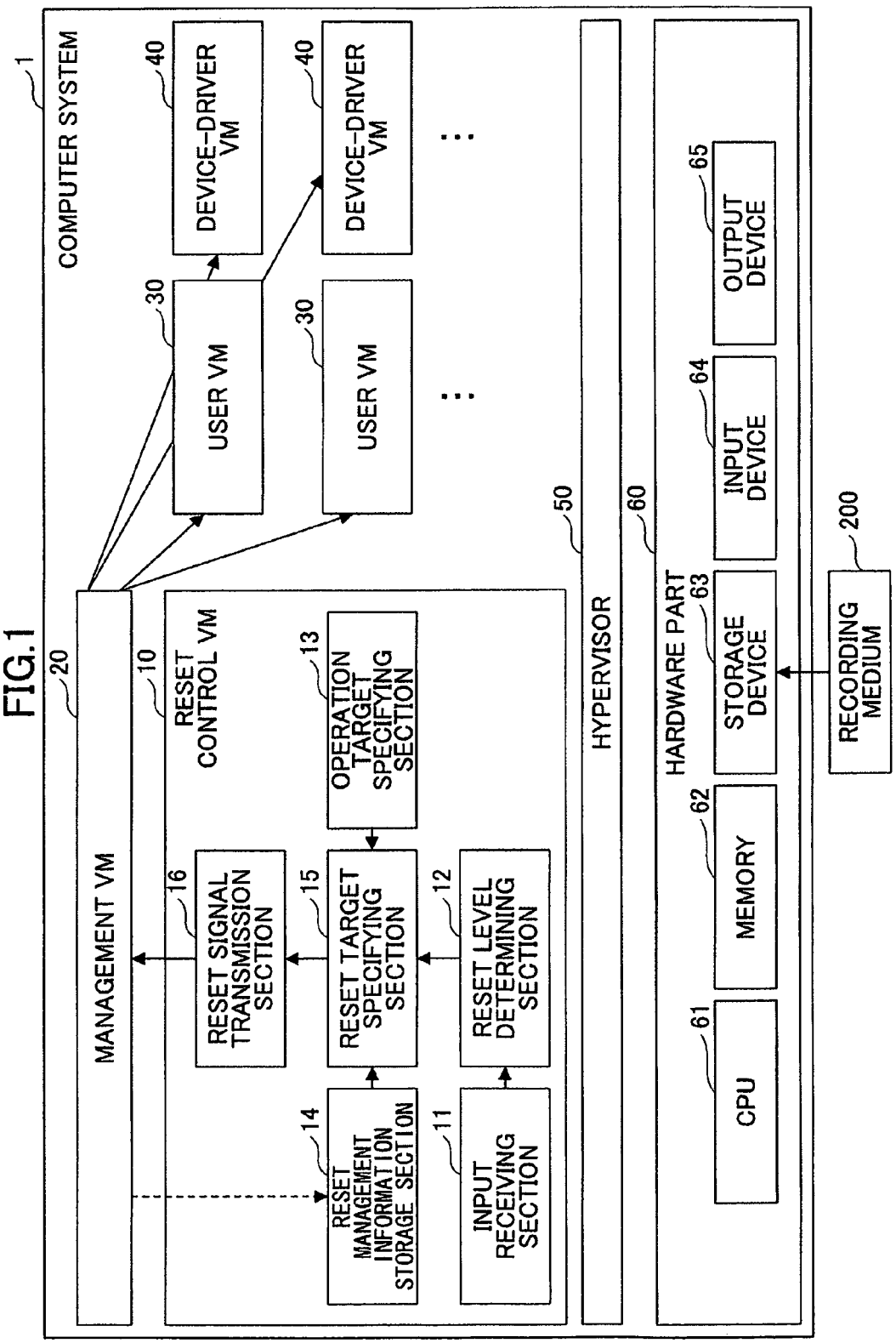
FIG. 1 illustrates an example of a computer system according to an embodiment of the present invention.

With virtualization techniques, it may be possible to virtually operate plural computers using a single physical computer. The virtualized computer based on the virtualization techniques may be called a virtual computer, a virtual machine (hereinafter may be simplified as "VM") or the like.

In a computer employing the virtualization techniques, a device mounted on or connected to the computer may be shared among plural virtual machines operating on the computer. In this case, a driver for using the device is required to be provided in each of the plural virtual machines.

Recently, a technique called a split driver has been proposed. In the split driver technique, in order to make it possible to use a common driver among plural virtual machines, a virtual machine having only drivers of the devices to be operated is provided so that the drivers are separated from the virtual machines for using the applications. When this technique is used, it may become possible to reduce the development work load necessary for developing the drivers for the virtual machines.

In such a computer employing the virtual techniques, when a failure occurs, for example, a reset process is performed to restore the system.

There is a technique in which an operating time period of a clear switch is measured, and based on the measurement result, it is determined whether only a single running information process is to be reset or a predetermined number of running information processes are to be simultaneously reset.

On the other hand, there is another technique in which a pressing operation time period of a predetermined key pressed by a user is measured, and, a process corresponding to the measured time period is performed by referring to a corresponding table indicating a corresponding relationship between the pressing operating time period of the predetermined key and controlling methods providing various guidance.

In a computer (computer system) employing the virtual techniques, if all the virtual machines are reset by, for example, pressing a reset button by a user, a virtual machine for which resetting is not necessary may have to be reset as well. Because of this feature, when all the virtual machines are reset, an application being used by a virtual machine for which resetting is not necessary may be interrupted or aborted. Moreover, it may take time to reset the virtual machines for which resetting is not necessary.

To resolve this problem, there may be a method in which the virtual machines relevant to the virtual machine that causes the failure are specified and reset. However, when this method is to be performed, it may be necessary for a user to have sufficient technical background (knowledge) in the virtual techniques so as to (correctly) specify the virtual machine causing the failure and determine a range (group) of the virtual machines to be reset based on the configurations of the virtual machines and the dependence relationships between the virtual machines.

Moreover, for example, in a system employing the split driver technique, the virtual machine where only drivers of the devices are to be operated (virtual machine for drivers) may not be viewed by a general (i.e., average-skilled) user. Because of this feature, it my be difficult for such a general user to fully understand sharing information relevant to the virtual machines for drivers and appropriately determine a range (group) of the virtual machines to be reset.

According to an embodiment of the present invention, there may be provided a technique that may resolve a problem described above and that may make it easier to perform reset control only on a limited range of virtual machines in a computer system employing the virtualization techniques.

In the following, embodiments of the present invention are described with reference to the accompanying drawings.

FIG. 1 is an example functional block diagram of a computer system 1 according to an embodiment of the present invention.

The computer system 1 employs the virtualization techniques, so that plural virtualized computers may operate on the computer system 1. Such a virtualized computer may be called a virtual machine or a virtual computer. In the following, the term virtual machine may be simplified as "VM". Therefore, in the computer system 1 of FIG. 1, a reset control VM 10, a management VM 20, a user VM 30, and a device-driver VM 40 (i.e., VM for device drivers) are virtual machines (VMs).

A hypervisor 50 may also be called a virtual machine monitor or a virtualization OS, and is a virtual machine management mechanism realizing the virtual machines on the computer system 1. The hypervisor 50 performs control on virtual machines on the computer system 1, the control including control of communications between the virtual machines on the computer system 1.

A hardware part 60 of the computer system 1 includes a CPU (Central Processing Unit) 61, a memory 62 such as a RAM (Random Access Memory), a storage device 63 such as an HDD (Hard Disk Drive), an input device 64 such as a key/button set, and an output device 65 such as an LCD (Liquid Crystal Display).

The reset control VM 10, the management VM 20, the user VM 30, the device-driver VM 40, and the hypervisor 50 are realized by the hardware part 60 such as the CPU 61 and the memory 62 in the computer system 1 and a software program. A program executable by the computer system 1 is stored in the storage device 63, and is loaded into the memory 62 to be executed by the CPU 61.

Further, a computer of the computer system 1 may directly read a program from a movable recording medium and perform processes in accordance with the program. Further, whenever receiving a program from a server computer, the computer of the computer system 1 may execute the received program. Further, the program may be stored in a computer-readable recording medium 200.

The management VM 20 manages the reset control VM 10, the user VM 30, and the device-driver VM 40 which are operating on the computer system 1. For example, in the computer system 1 of FIG. 1, the management VM 20 manages the start and stop of the VMs (Virtual Machines).

The user VM 30 is to be operated by a user, so that the user may use the application or the like related to the user VM 30.

The device-driver VM 40 refers to a virtual machine where a driver for the device of the computer system 1 is operated. In the virtual machines in FIG. 1, a technique called split driver is employed, so that plural user VMs 30 share the device and the relevant driver. The device-driver VM 40 may not be viewed by a general user.

The reset control VM 10 performs reset control on the VMs in accordance with a reset operation performed by a user. Further, the reset of a VM may include only stop the VM, or may include from stopping of a VM to starting (restart) the VM. As illustrated in FIG. 1, the reset control VM 10 includes an input receiving section 11, a reset level determining section 12, an operation target specifying section 13, a reset management information storage section 14, a reset target specifying section 15, and a reset signal transmission section 16.

The input receiving section 11 receives an input signal indicating an input operation from a device where a user performs an input operation for reset.

The reset level determining section 12 determines a reset level based on the received signal indicating the input operation. Namely, the reset level determining section 12 analyzes the input signal indicating the input operation, the signal having been received by the input receiving section 11, so as to determine the reset level instructed by the user. Herein, the reset level includes several levels corresponding to the ranges (groups) of the VMs on which the reset process is to be performed.

The operation target specifying section 13 specifies the user VM 30 which is a target of the operation based on a received input signal indicating the input operation. Namely, the operation target specifying section 13 specifies the user VM 30 which is an operation target of the user when the user instructs the reset operation.

The reset management information storage section 14 is a computer-accessible storage section storing reset management information. Herein, the reset management information includes the reset level, and identification information of the VM for each of the user VMs 30 which are the operation targets of the user, the identification information of the VM being determined as a target of the reset process based on the reset level. Namely, the reset management information is the information specifying the user VMs 30 that are targets to be operated by the user, and also specifying the VMs that are to be the targets of the reset process and that are determined based on the reset level instructed by the user.

The reset target specifying section 15 specifies the VM that is to be a target of the reset process based on the determined reset level. Specifically, by referring to the reset management information, the reset target specifying section 15 obtains the user VM 30 to be specified as an operation target of the user and the identification information of the VM corresponding to the determined reset level. Then, the reset target specifying section 15 specifies the VM indicated by the obtained identification information as the VM to be a target of the reset process.

The reset signal transmission section 16 transmits a signal to perform the reset process on the VM having been determined to be a target of the reset process. Namely, the reset signal transmission section 16 transmits information indicating the VM having been determined to be a target of the reset process (reset process target VM) to the management VM 20 so as to cause the management VM 20 to perform the reset process on the VM.

FIG. 2 illustrates an example of the reset management information 19 according to an embodiment of the present invention.

As illustrated in FIG. 2, the reset management information 19 includes information items including the operation target VM, the reset level, and the reset process target VM.

The operation target VM is the information indicating the user VM 30 that is to be the operation target of the user. In the reset management information 19 of FIG. 2, a VM name is described as the operation target VM.

The reset level is the information indicating a range (group) of the VMs on which the reset process is to be performed. In the reset management information 19 of FIG. 2, the range of the VMs on which the reset process is to be performed is classified into three levels (reset levels). In the reset management information 19 of FIG. 2, the range of the reset level "1" is the narrowest (i.e., the number of VMs that are targets of the reset process in the reset level "1" is less than the number of VMs that are targets of the reset process in the reset level "3"), and the range of the reset level "3" is the broadest (i.e., the number of VMs that are targets of the reset process in the reset level "3" is greater than the number of VMs that are targets of the reset process in the reset level "1").

The reset process target VM is the information indicating the VM that is to be a target of the reset process. In the reset management information 19 of FIG. 2, the VM name is described as the reset process target VM. Further, in the reset management information 19 of FIG. 2, it is assumed that the reset process target VMs of a higher reset level include the reset process target VMs of a lower reset level.

In the reset management information 19, the range of the reset process target VMs corresponds to the operation target VMs and the reset level is set based on the dependency relationship between the VMs. For example, in the reset management information 19, when the reset level is "1", only the operation target VM is the reset process target VM. When the reset level is "2", for example, the reset process target VMs are determined based on the dependency relationship between the VMs. For example, in the case of the reset level "2", the operation target VMs and the VMs having a direct dependency relationship with the operation target VMs are the reset process target VMs.

The reset management information 19 may be provided in advance as static information, or may be dynamically generated when, for example, the VM system in the computer system 1 is started (booted).

Figure 3:
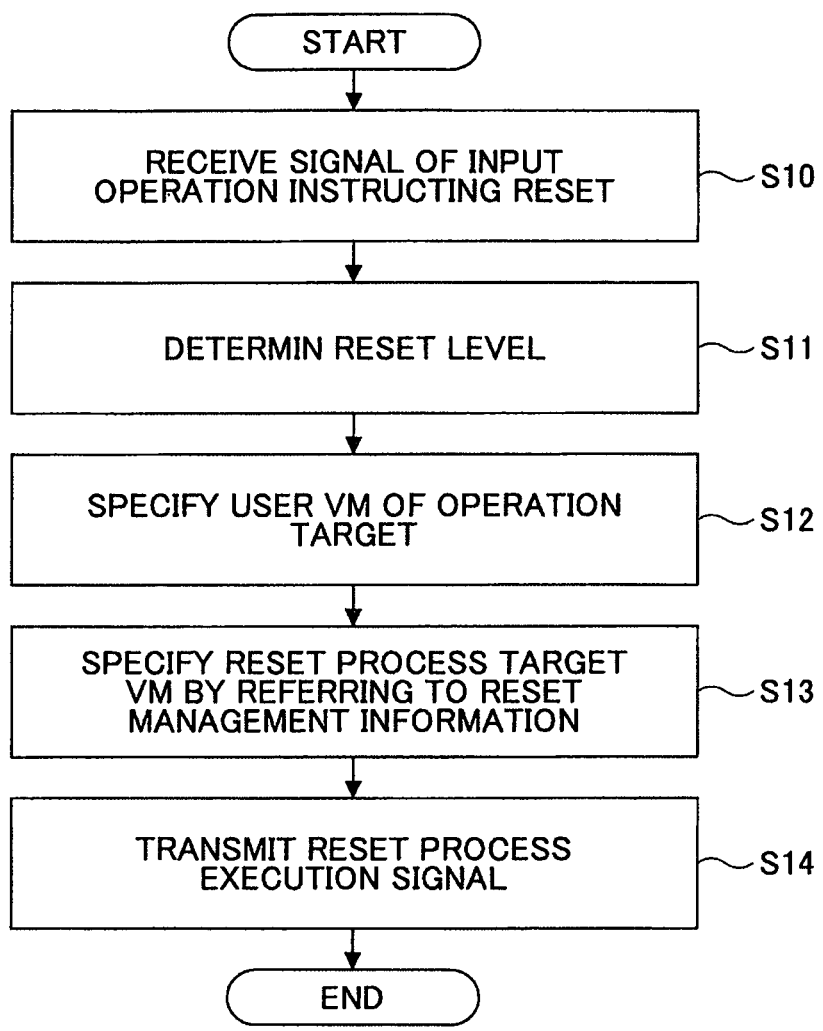
FIG. 3 is an example flowchart of a reset control process according to an embodiment of the present invention.

FIG. 3 is an example flowchart of the reset control process according to an embodiment of the present invention.

In the reset control VM 10, the input receiving section 11 receives a signal of an input operation instructing the reset process from a device where a user performs the input operation instructing the reset operation (step S10).

For example, it is assumed that a reset button is provided as the device to instruct the reset operation by a user and the user presses the reset button to reset the VM. When the user presses the reset button, the input receiving section 11 receives a signal from the reset button, the signal indicating the pressing down of the reset button.

Based on the received signal of the input operation, the reset level determining section 12 determines the reset level (step S11).

For example, in the case where the reset button is provided as the device to instruct the reset operation by a user, the reset level determining section 12 determines the reset level depending on the pressing down time period of the reset button. In this case, the reset level determining section 12 determines the pressing down time period of the reset button by analyzing the received signal of the input operation. The reset level determining section 12 determines the reset level depending on the pressing down time period of the reset button. For example, when the pressing down time period of the reset button is "short" (e.g., less than one second), the reset level determining section 12 determines that the reset level is "1"; when the pressing down time period of the reset button is "middle" (e.g., in a range from one second to three seconds), the reset level determining section 12 determines that the reset level is "2" and when the pressing down time period of the reset button is "long" (e.g., greater than three second), the reset level determining section 12 determines that the reset level is "3".

The operation target specifying section 13 specifies the user VM 30 that is to be a target of the operation by the signal of the input operation (i.e., the operation target VM) (step S12). When a user instructs the reset operation, the user VM 30 which is operated by the user 30 is the operation target VM.

The reset target specifying section 15 refers to the reset management information 19 stored in the reset management information storage section 14 and specifies the reset process target VMs (step S13).

For example, a case is considered where the reset level is determined to be "2" by the reset level determining section 12 and the user VM 30 of the VM name "guest a" as the operation target VM is specified by the operation target specifying section 13. In this case, the reset target specifying section 15 refers to the reset management information 19 illustrated in FIG. 2 based on the VM name "guest a" of the operation target VM and the reset level "2". From the reset management information 19 illustrated in FIG. 2, the reset target specifying section 15 specifies the user VM 30 having the VM name "guest a", the device-driver VM 40 having the VM name "driver a", and the device-driver VM 40 having the VM name "driver b" as the reset process target VMs. Further, as described above, in the reset management information 19 illustrated in FIG. 2, the reset process target VMs in a higher reset level (reset level "2") include the reset process target VMs in a lower reset level (reset level "1").

The reset signal transmission section 16 transmits a signal to perform the reset process on the reset process target VM specified by the reset target specifying section 15 to the management VM 20 (step S14). In the VM system of the computer system 1 illustrated in FIG. 1, the management VM 20 manages the start/stop of the VMs. Therefore, the signal to perform the reset process is transmitted from the reset control VM 10 to the management VM 20. The management VM 20 stops the reset process target VM and restarts the reset process target VM after the reset process target VM has been stopped.

By having the above structure (mechanism) of the reset control, it may become possible for a (general) user to easily perform the reset control on a limited range of VMs on which the reset process is to be performed. Further, the range of VMs on which the reset process is to be performed may be determined based on the reset management information 19 provided based on the dependency relationships between the VMs or the like. Therefore, it may become possible to perform the reset control on a limited range of the VMs in accordance with the dependency relationships among the VMs.

In the following, more specific examples of the reset control according to an embodiment of the present invention are described by referring to a mobile terminal such as a cellular phone. Recently, due to the improvement of the CPU performance and the increase of the capacity of the memory, hardware resources used in embedded devices and mobile terminals have been improved. Therefore, the virtualization techniques have been employed in such embedded devices and mobile terminals more than ever.

FIG. 4 is an example functional block diagram of a mobile terminal according to an embodiment of the present invention.

A mobile terminal 100 illustrated in FIG. 4 corresponds to the computer system 1 illustrated in FIG. 1. Namely, the mobile terminal 100 illustrated in FIG. 4 is a computer employing the virtualization techniques, and plural VMs operate on the mobile terminal 100. As illustrated in FIG. 4, the VMs such as a reset control VM 110, a management VM 120, a guest VM 130, a driver VM 140 and the like operate on the mobile terminal 100.

Further, a hypervisor 150 in the mobile terminal 100 of FIG. 4 corresponds to the hypervisor 50 in the computer system 1 of FIG. 1. The hypervisor 150 is a virtual machine management mechanism realizing the VMs on the mobile terminal 100. The hypervisor 150 performs control on the VMs operating on the mobile terminal 100, the control including the control of communications between the VMs.

The mobile terminal 100 includes a hardware part 160 including various devices such as a reset button 161, a power button 162, a USB (Universal Serial Bus) connection terminal 163, an HDD 164, a NAND storage device 165, a camera 166, various keys 167, a NIC (Network Interface Card) 168, an LCD 169 and the like. Those various devices may be incorporated in the mobile terminal 100 or connected to the mobile terminal 100. The HDD 164 and the NAND storage device 165 correspond to the storage device 63 of the computer system 1 in FIG. 1. The reset button 161, the power button 162, the camera 166, and the various keys 167 correspond to the input device 64 of the computer system 1 in FIG. 1. The various keys 167 are, for example, input keys to input figures and characters and the like, a dial key, a talk key and the like. The LCD 169 corresponds to the output device 65 of the computer system 1 in FIG. 1.

Further, similar to the computer system 1 in FIG. 1, as the components of the hardware part 160, the mobile terminal 100 further includes a CPU and a memory (both not shown). The reset control VM 110, the management VM 120, the guest VM 130, the driver VM 140, and the hypervisor 150 may be realized by the hardware such as the CPU, the memory and the like and the software programs included in the computer of the mobile terminal 100. The program executable by the computer of the mobile terminal 100 are stored in a storage device such as the HDD 164 and the NAND storage device 165 and loaded into the memory to be executed by the CPU.

The management VM 120 in the mobile terminal 100 of FIG. 4 corresponds to the management VM 20 in the computer system 1 of FIG. 1. The management VM 120 manages the start/stop of the various VMs such as the reset control VM 110, the guest VM 130, the driver VM 140 and the like operating on the mobile terminal 100. The management VM 120 includes a VM control section 121, a VM start/stop order management section 122, a VM configuration definition management section 123, and a VM access policy management section 124.

The VM control section 121 performs control of the start/stop of the VMs. The VM start/stop order management section 122 manages a start order and stop order of the VMs. The VM configuration definition management section 123 manages the definitions of the configurations of the VMs. The VM access policy management section 124 manages the accesses between the VMs.

As described above, the management VM 120 has a role to control other VMs. Therefore, the management VM 120 alone cannot be a target of the reset process according to an embodiment of the present invention. The resetting of the management VM 120 may be performed when the entire VM system including the hypervisor 150 is to be reset.

The guest VM 130 in the mobile terminal 100 of FIG. 4 corresponds to the user VM 30 in the computer system 1 of FIG. 1. In the guest VM 130, a guest OS operates. On the mobile terminal 100, plural guest VMs such as a guest VM (#1) 130a, a guest VM (#2) 130b and the like may operate. At that time, a user may operate the user VM 130 displayed on the screen of the LCD 169.

Among the plural guest VMs 130, the OSs operating in the plural guest VMs 130 may be different from each other. In the mobile terminal 100 employing the virtualization techniques, a user may simultaneously use plural guest VMs 130 in which OSs different from each other operate. For example, in a case where the mobile terminal 100 is a cellular phone, it may be possible to operate a guest OS provided by a carrier A in a guest VM 130 and another guest OS provided by a carrier B in another guest VM 130. In this case, the user may use two cellular-phone services of the carrier A and the carrier B within a single mobile terminal 100.

The driver VM 140 in the mobile terminal 100 of FIG. 4 corresponds to the device-driver VM 40 in the computer system 1 of FIG. 1. The driver VM 140 is a VM where the driver for the device of the mobile terminal 100 operates. The driver VM 140 may be provided in a different manner from that of the guest VM 130 that is (directly) used by a user. Therefore, the driver VM 140 may not be viewed by a general user.

As described above, various devices may be included in the mobile terminal 100 or provided so as to be connected to the mobile terminal 100. Further, in the mobile terminal 100 employing the virtualization techniques, such a device may be connected in a manner such that the device is commonly used (shared) by plural VMs. Therefore, it may be necessary to provide (develop) a driver to use the device for each of the VMs. In this case, if a driver for using the device is provided (developed) for each of the VMs, the development load may be increased.

In the mobile terminal 100 illustrated in FIG. 4, a technique called split driver is employed in which a diver is separated from the guest OS so that the driver may be commonly used (shared) among plural VMs, the guest OS being provided for using the application. To that end, in the mobile terminal 100, the driver VM 140 where only the drivers for the respective devices operates is provided. By employing (introducing) the technique, it may become possible to reduce the development load to develop drivers for the VMs in the mobile terminal 100.

In the mobile terminal 100 illustrated in FIG. 4, for example, a driver VM (LCD) 140a is a driver VM 140 where only the device driver for the LCD 169 operates. Similarly, a driver VM (NIC) 140b is a driver VM 140 where only the device driver for the NIC 168 operates. For example, the driver VM (LCD) 140a includes an LCD driver (back end) 141 as the back-end driver controlling the LCD 169.

In the VM that uses the LCD 169 by using the function of the driver VM (LCD) 140a, a front-end driver is provided to make communications with the LCD driver (back end) 141. For example, in the mobile terminal 100 illustrated in FIG. 4, the guest VM (#1) 130a that uses the LCD 169 includes an LCD driver (front end) 131 as the front-end driver to communicate with the LCD driver (back end) 141. Upon using the LCD 169, the guest VM (#1) 130a makes communications from the LCD driver (front end) 131 to the LCD driver (back end) 141 via the hypervisor 150 so as to use the function of the LCD driver (back end) 141. Further, similar to the guest VM (#1) 130a, the reset control VM 110 that uses the LCD 169 includes an LCD driver (front end) 141 as the front-end driver to communicate with the LCD driver (back end) 141.

By having the configuration described above, in the mobile terminal 100 illustrated in FIG. 4, the devices and the respective device drivers may be shared among the VMs.

In the mobile terminal 100 employing such virtualization techniques, when a failure occurs, it may be necessary to perform the reset process by stopping the VM relevant to a cause of the failure first and restarting the VMs.

In this case, if a user is, for example, an engineer having sufficient knowledge of the virtualization techniques, the user may be able to specify the VM relevant to the cause of the failure and sequentially reset the VMs to be required to be reset based on the VM configuration and the dependency relationships among the VMs.

However, if a user is a general user not having sufficient knowledge of the virtualization techniques, the user may have difficulty to even determine whether the cause of the occurred failure comes from the application side or the OS/driver side. Even in a case where the VM relevant to the cause of the failure may be detected, if the VM is, for example, the driver VM 140 which is being shared among plural guest VMs 130, it may be necessary to determine a range (group) of the VMs to be reset based on the consideration of the dependency relationships among the VMs. However, such operations may be too difficult for such a general user.

There may be one method in which the entire VM system including the hypervisor 150 and the like is reset. In this case, however, a VM that does not need to be reset may have to be reset. Further, in this case, the application being used by the VM that does not need to be reset may be interrupted or aborted. Moreover, it may waste much time to stop and restart all the VMs including the VMs that do not need to be reset.

On the other hand, in the mobile terminal 100 according to an embodiment of the present invention, by having the reset control VM 110 described in detail below, it may become possible to easily perform appropriate reset control on a limited range (number) of the VMs based on the VM configuration and the dependency relationships among the VMs with simple operations that may be easily understood by reading descriptions in a manual by a general user.

The reset control VM 110 in the mobile terminal 100 illustrated in FIG. 4 corresponds to the reset control VM 10 in the computer system 1 of FIG. 1. The reset control VM 110 performs reset control on the VMs in accordance with the reset operation performed by a user. As illustrated in FIG. 4, the reset control VM 110 includes a reset button driver 111, an input analysis section 112, a reset range control section 113, a front switch control section 115, and an LCD driver (front end) 116. Further, the reset range control section 113 includes a reset management table 114.

The reset button driver 111 of the reset control VM 110 illustrated in FIG. 4 corresponds to the input receiving section 11 of the reset control VM 10 illustrated in FIG. 1. Further, the input analysis section 112 of the reset control VM 110 illustrated in FIG. 4 corresponds to the reset level determining section 12 and the operation target specifying section 13 of the reset control VM 10 illustrated in FIG. 1. Further, the of the reset control VM 110 illustrated in FIG. 4 corresponds to the reset management information storage section 14, the reset target specifying section 15, and the reset signal transmission section 16 of the reset control VM 10 illustrated in FIG. 1.

The reset button driver 111 is a device driver of the reset button 161. When a user presses down the reset button 161, the reset button driver 111 receives a signal indicating the pressing down operation from the reset button 161. Further, in this embodiment, it is assumed that the instruction to perform the reset operation performed by a user is performed by pressing down the reset button 161.

The input analysis section 112 analyzes the signal that is received from the reset button 161 and that is received by the reset button driver 111, and obtains the reset level based on the analysis result. In this embodiment, there are three reset levels. Those three reset levels are identified from each other depending on the period (time period) while the reset button 161 is pressed down. Further, the input analysis section 112 specifies the guest VM that is an operation target of the user at the time when the reset operation is issued (instructed).

The reset range control section 113 includes the reset management table 114. The reset management table 114 corresponds to the reset management information 19 illustrated in FIG. 2. Namely, the reset management table 114 is the information (table) indicating the reset process target VMs for each of the operation target VMs and for each of the reset levels.

The reset range control section 113 refers to the reset management table 114 based on the specified operation target VMs and the reset level obtained by the analysis result, and obtains information (a list) of the reset process target VMs based on the reset management table 114. The reset range control section 113 transmits the obtained list of the reset process target VMs to the management VM 120.

The front switch control section 115 perform control to switch (select) the front-end driver having a priority to be processed by the LCD driver (back end) 141. When the front-end driver to be processed by the LCD driver (back end) 141 is switched, the screen displayed on the LCD 169 may be accordingly changed.

The LCD driver (front end) 116 is the front-end driver that is to communicate with the LCD driver (back end) 141 so that the reset control VM 110 may use the LCD 169.

FIGS. 5A and 5B are examples of VM start/stop order information.

The VM start/stop order information 126 is included in the VM start/stop order management section 122 of the management VM 120, and is the information used to manage the start order and the stop order of the VMs operating on the mobile terminal 100. FIG. 5A illustrates an example data structure of the VM start/stop order information 126. On the other hand, FIG. 5B illustrates a specific example of the VM start/stop order information 126.

As illustrated in FIG. 5A, in the VM start/stop order information 126, the VMs are described in the order of starting, the information items of the VMs including the information indicating a start address of an area where the VM is stored in the NAND storage device 165 and the information indicating a file name of the VM including path information. The stop order of VMs is opposite to the start order of the VMs.

For example, the VM start/stop order information 126 illustrated in FIG. 5B illustrates the information where the start order of the VMs in the mobile terminal 100 illustrated in FIG. 4 is defined. According to the example of the VM start/stop order information 126 illustrated in FIG. 5B, the VMs are sequentially started in the order of the file names: "lcd-dev-vm", "nic-dev-vm", "guest#1-vm", "guest#2-vm", and "reset-ctl-vm". Further, in the example of the VM start/stop order information 126 illustrated in FIG. 5B, it is assumed that the file names of the VMs refer to VM-IDs of the respective VMs. Herein, the VM-ID refers to identification information uniquely identifying the VMs.

In the example of the VM start/stop order information 126 illustrated in FIG. 5B, the file name "lcd-dev-vm" refers to the VM-ID of the driver VM (LCD) 140a; the file name "nic-dev-vm" refers to the VM-ID of the driver VM (NIC) 140b; the file name "guest#1-vm" refers to the VM-ID of the guest VM (#1) 130a; the file name "guest#2-vm" refers to the VM-ID of the guest VM (#2) 130b; and the file name "reset-ctl-vm" refers to the VM-ID of the reset control VM 110.

Namely, in the mobile terminal 100 illustrated in FIG. 4, based on the VM start/stop order information 126 illustrated in FIG. 5B, the VMs are sequentially started in the order of the driver VM (LCD) 140a, the driver VM (NIC) 140b, the guest VM (#1) 130a, the guest VM (#2) 130b, and the reset control VM 110.

FIGS. 6A and 6B are examples of VM configuration definition information.

The VM configuration definition information 127 is included in the VM configuration definition management section 123 of the management VM 120 and is used to manage the definitions of the configurations of the VMs to be operated on the mobile terminal 100. FIG. 6A illustrates the data structure of the VM configuration definition information 127, and FIG. 6B illustrates a specific example of the VM configuration definition information 127.

As illustrated in FIG. 6A, the VM configuration definition information 127 includes data of information items for each of the VMs, the information items including the VM-ID which is the identification information of the VM, a VM type indicating the type of the VM, the number of virtual CPUs indicating an amount of resources allocated to the VM, a virtual memory size, and a virtual disk size.

For example, the VM configuration definition information 127 illustrated in FIG. 6B is the information in which the configurations of the VMs in the mobile terminal 100 illustrated in FIG. 4 are defined. In the VM configuration definition information 127 illustrated in FIG. 6B, the VM type "dev" indicates that the VM is the driver VM 140; the VM type "guest" indicates that the VM is the guest VM 130; the VM type "ctl" indicates that the VM is for control.

FIG. 7 is an example of VM access policy information.

The VM access policy information 128 is included in the VM access policy management section 124 of the management VM 120 and is used to manage the accesses between the VMs to be operated on the mobile terminal 100 illustrated in FIG. 4. The VM access policy information 128 is used to control the communications between VMs, the control being performed by the hypervisor 150.

In the example of the VM access policy information 128 illustrated in FIG. 7, a symbol "r" denotes that the VM of the access source may receive a message from the VM of the access destination; a symbol "w" denotes that the VM of the access source may transmit a message to the VM of the access destination; and a symbol "x" denotes that the VM of the access source may perform control to, for example, start and stop the VM of the access destination. In the example of the VM access policy information 128 illustrated in FIG. 7, the VM name is used to indicate the management VM 120 only, and the VM-ID is used to indicate the VMs other than the management VM 120.

According to the VM access policy information 128 illustrated in FIG. 7, the management VM 120 may not transmit and receive a message to and from any of the driver VM (LCD) 140a, the driver VM (NIC) 140b, the guest VM (#1) 130a, and the guest VM (#2) 130b. Further, the management VM 120 may perform control to, for example, start and stop the driver VM (LCD) 140a, the driver VM (NIC) 140b, the guest VM (#1) 130a, and the guest VM (#2) 130b. Further, the management VM 120 may transmit and receive a message to and from the reset control VM 110. Further, the management VM 120 may perform control to, for example, start and stop the reset control VM 110.

According to the VM access policy information 128 illustrated in FIG. 7, the driver VM (LCD) 140a may not transmit and receive a message to and from any of the management VM 120 and the driver VM (NIC) 140b. Further, the driver VM (LCD) 140a may not perform control to, for example, start and stop any of the management VM 120 and the driver VM (NIC) 140b. Further, the driver VM (LCD) 140a may transmit and receive a message to and from the guest VM (#1) 130a, the guest VM (#2) 130b, and the reset control VM 110. Further, the driver VM (LCD) 140a may not perform control to, for example, start and stop any of the guest VM (#1) 130*a*, the guest VM (#2) 130*b*, and the reset control VM 110.

According to the VM access policy information 128 illustrated in FIG. 7, the driver VM (NIC) 140*b* may not transmit and receive a message to and from any of the management VM 120, the driver VM (LCD) 140*a*, the guest VM (#2) 130*b*, and the reset control VM 110. Further the driver VM (NIC) 140*b* may not perform control to, for example, start and stop any of the management VM 120, the driver VM (LCD) 140*a*, the guest VM (#2) 130*b*, and the reset control VM 110. Further, the driver VM (NIC) 140*b* may transmit and receive a message to and from the guest VM (#1) 130*a*. Further, the driver VM (NIC) 140*b* may not perform control to, for example, start and stop the guest VM (#1) 130*a*.

According to the VM access policy information 128 illustrated in FIG. 7, the guest VM (#1) 130*a* may not transmit and receive a message to and from any of the management VM 120 and the reset control VM 110. Further the guest VM (#1) 130*a* may not perform control to, for example, start and stop any of the management VM 120 and the reset control VM 110. Further, the guest VM (#1) 130*a* may transmit and receive a message to and from the driver VM (LCD) 140*a*, the driver VM (NIC) 140*b*, and the guest VM (#2) 130*b*. Further, the guest VM (#1) 130*a* may not perform control to, for example, start and stop any of the driver VM (LCD) 140*a*, the driver VM (NIC) 140*b*, and the guest VM (#2) 130*b*.

According to the VM access policy information 128 illustrated in FIG. 7, the guest VM (#2) 130*b* may not transmit and receive a message to and from any of the management VM 120, the driver VM (NIC) 140*b*, and the reset control VM 110. Further the guest VM (#2) 130*b* may not perform control to, for example, start and stop any of the management VM 120, the driver VM (NIC) 140*b*, and the reset control VM 110. Further, the guest VM (#2) 130*b* may transmit and receive a message to and from the driver VM (LCD) 140*a* and the guest VM (#1) 130*a*. Further, the guest VM (#2) 130*b* may not perform control to, for example, start and stop any of the driver VM (LCD) 140*a* and the guest VM (#1) 130*a*.

According to the VM access policy information 128 illustrated in FIG. 7, the reset control VM 110 may transmit and receive a message to and from the management VM 120 and the driver VM (LCD) 140*a*. Further the reset control VM 110 may not perform control to, for example, start and stop any of the management VM 120 and the driver VM (LCD) 140*a*. Further, the reset control VM 110 may not transmit and receive a message to and from any of the driver VM (NIC) 140*b*, the guest VM (#1) 130*a*, and the guest VM (#2) 130*b*. Further, the reset control VM 110 may not perform control to, for example, start and stop any of the driver VM (NIC) 140*b*, the guest VM (#1) 130*a*, and the guest VM (#2) 130*b*.

Figures 8B, 9:
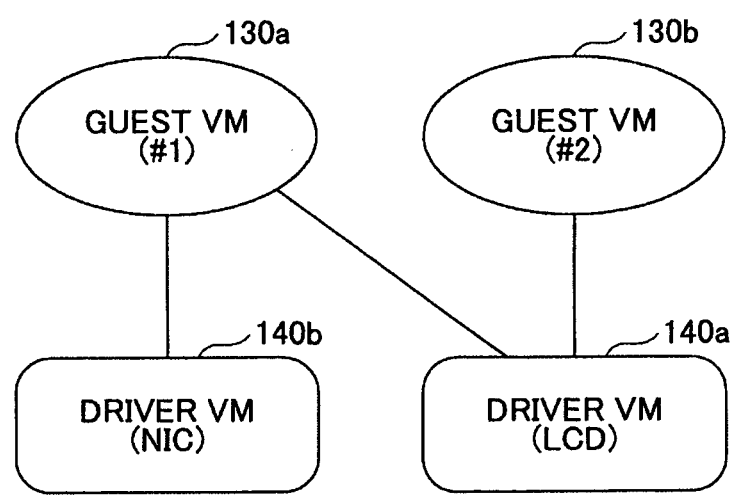

FIGS. 8A and 8B are examples of the configurations of the reset management table.

Similar to the reset management information 19 illustrated in FIG. 2, the reset management table 114 illustrated in FIG. 8A includes information items indicating the operation target VM, the reset level, and the reset process target VM.

The operation target VM is the information indicating the guest VM 130 which is an operation target of the user. In the reset management table 114 illustrated in FIG. 8A, the operation target VM is described using the VM-ID. The reset level is the same as the reset level of the reset management information 19 illustrated in FIG. 2.

The reset process target VM is arrangement information of data indicating the VMs that are to be targets of the reset process. In the reset management table 114 illustrated in FIG. 8A, the "data*" denotes data for each of the reset process target VMs.

FIG. 8B is an example of a structure of the "data*" indicating the reset process target VM in the reset management table 114 illustrated in FIG. 8A. The "data*" includes information items indicating the VM-ID, the number of sharing, a start/stop state and the like. The VM-ID refers to the identification information of the reset process target VM. The number of sharing refers to, when the reset process target VM is a driver VM, the number of guest VMs 130 sharing the driver VM. Therefore, when the reset process target VM is a guest VM 130, a date of the number of sharing is "0". The start/stop state is a flag indicating whether the reset process target VM is being started. In the example of the "data*" illustrated in FIG. 8B, a value "0" denotes that the reset process target VM is being stopped, and a value "1" denotes that the reset process target VM is being started (operated).

The reset management table 114 may be provided in advance as static information. For example, in a case where the configuration of the VMs embedded into the mobile terminal 100 is determined or the like, based on the dependency relationships among the VMs in the VM configuration, a developing engineer may prepare and install the reset management table 114 in the mobile terminal 100 in advance.

Further, the reset management table 114 may be dynamically generated based on the configuration of the VMs operating on the mobile terminal 100. For example, upon the mobile terminal 100 being started, the mobile terminal 100 may dynamically generate the reset management table 114 based on the configuration of the VMs operating on the mobile terminal 100 and the dependency relationships among the VMs.

Herein, a case is described where the reset management table 114 is dynamically generated upon the mobile terminal 100 being started.

When the power is turned ON and the boot of the devices in the mobile terminal 100 is completed, a program called loader reads the hypervisor 150 from the NAND storage device 165 and executes the hypervisor 150. The hypervisor 150 starts its operation as a virtual machine monitor. After starting the operation as a virtual machine monitor, the hypervisor 150 reads the management VM 120 from the NAND storage device 165 and executes the management VM 120. Then, the management VM 120 starts its operation.

The VM control section 121 of the management VM 120 sequentially issues start commands to start the VMs to the hypervisor 150 based on the VM start/stop order information 126 stored in the VM start/stop order management section 122 and the VM configuration definition information 127 stored in the VM configuration definition management section 123. For example, the VM control section 121 sequentially issues the start commands to the hypervisor 150 so that the VMs are sequentially started (one by one) in the order of the driver VM (LCD) 140*a*, the driver VM (NIC) 140*b*, the guest VM (#1) 130*a*, and the guest VM (#2) 130*b*, and the reset control VM 110. The hypervisor 150 reads the VMs from the NAND storage device 165 in accordance with the start commands and executes the VMs. The VMs start their operations.

It is assumed that, during the start of the VMs, the management VM 120 dynamically generates the reset management table 114. It is also assumed that the management VM 120 further includes a function section (not shown) to dynamically generate the reset management table 114 based on the configuration of the VMs and the dependency relationships among the VMs.

FIG. 9 is an example of a configuration of the VMs according to an embodiment of the present invention.

FIG. 9 illustrates an access relationship between the guest VMs 130 and the driver VMs 140 in the configuration of the VMs operating on the mobile terminal 100. The access relationship between the VMs illustrated in FIG. 9 is based on the VM access policy information 128 illustrated in FIG. 7.

In the following, a case is described where the reset management table 114 is dynamically generated when the configuration of the VMs operating on the mobile terminal 100 is the configuration of the VMs illustrated in FIG. 9. Further, it is assumed that the management VM 120 and the reset control VM 110 are not included in the VMs that are the targets of the reset control operation.

After the management VM 120 is started, the management VM 120 generates the reset management table 114 based on a predetermined reset control policy. The reset control policy is used to determine a range of the VMs that are the targets of the reset process based on the dependency relationships between VMs for each of the reset levels.

FIGS. 10A and 10B are examples of reset control policy according to an embodiment of the present invention.

FIGS. 10A and 10B illustrate two reset control policies. In the reset control policies illustrated in FIGS. 10A and 10B, a reset range is defined for each of the reset levels. Herein, the reset range refers to a range of the VMs that are targets of reset control (reset control target VMs). In the reset control policies illustrated in FIGS. 10A and 10B, a reset range of a higher reset level includes a reset range of a lower reset level.

Further, as illustrated in FIGS. 10A and 10B, in the mobile terminal 100 the reset level is determined based on the length (time period) of the pressing down operation of the reset button 161 by a user. When determining that the length (time period) of the pressing down operation of the reset button 161 by a user is "short", the input analysis section 112 determines that the reset level is "1". When determining that the length (time period) of the pressing down operation of the reset button 161 by a user is "middle", the input analysis section 112 determines that the reset level is "2". When determining that the length (time period) of the pressing down operation of the reset button 161 by a user is "long", the input analysis section 112 determines that the reset level is "3".

In the reset control policy (1) illustrated in FIG. 10A, the reset range of the reset level "1" refers to the guest VM 130 which is the target of the operation (i.e., the operation target VM).

In the reset control policy (1) illustrated in FIG. 10A, the reset range of the reset level "2" refers to the driver VM 140 that is used by the operation target VM. In this case, it doesn't matter whether the driver VM 140 used by the operation target VM is shared with other guest VMs.

In the reset control policy (1) illustrated in FIG. 10A, the reset range of the reset level "3" refers to the other driver VM 140 that shares the driver VM 140 that is used by the operation target VM.

A feature of the reset control policy (1) illustrated in FIG. 10A may be that when it is determined that the length (time period) of the pressing down operation of the reset button 161 by a user is "middle", the driver VM 140 that is used by the operation target VM is reset regardless of the use state of the other guest VM 130 that shares the driver VM 140.

In the reset control policy (2) illustrated in FIG. 10B, the reset range of the reset level "1" refers to the guest VM 130 which is the target of the operation (i.e., the operation target VM).

In the reset control policy (2) illustrated in FIG. 10B, the reset range of the reset level "2" refers to the driver VM 140 that is used by the operation target VM alone. Unlike the reset control policy (1) illustrated in FIG. 10A, in the reset control policy (2) illustrated in FIG. 10B, the driver VM 140 that is shared by the other guest VM 130 is not included in the VMs of the reset range of the reset level "2".

In the reset control policy (2) illustrated in FIG. 10B, the reset range of the reset level "3" refers to the following VMs:
1) the driver VM 140 that is shared among and used by the operation target VM as well as the other the guest VM 130;
2) the guest VM 130 sharing the driver VM 140 that is used by the operation target VM; and
3) the driver VM 140 used by the guest VMs 130 that share the driver VM 140 that is used by the operation target VM.

A feature of the reset control policy (2) illustrated in FIG. 10B may be that, in the case where the length (time period) of the pressing down operation of the reset button 161 by a user is "middle", the driver VM 140 that is used by the operation target VM is not reset in consideration of the use state of the other guest VMs 130 that share the driver VM 140. Namely, when the length (time period) of the pressing down operation of the reset button 161 by a user is "middle", the driver VM 140 that is used by the operation target VM and the other guest VM 130 is not reset. In the reset control policy (2) illustrated in FIG. 10B, the driver VM 140 that is shared among the operation target VM and the other guest VMs 130 is not the VM of the reset range of the reset level "2" but the VM of the reset range of the reset level "3".

Another feature of the reset control policy (2) illustrated in FIG. 10B may be that the driver VM 140 used by the guest VMs 130 sharing the driver VM 140 used by the operation target VM is also included as the VM of the reset range of the reset level "3".

As described above, it may be possible to arbitrarily define the reset control policy to generate the reset management table 114 based on the dependency relationships among the VMs.

The management VM 120 dynamically generates the reset management table 114 based on, for example, a program working on an algorithm based on the reset control policy. Further, for example, the reset control policy may be provided as definition information, and based on a general-purpose program based on the definition information of the reset control policy, the management VM 120 may generate the reset management table 114.

Further, two or more reset control policies may be provided in advance, so that, when the reset management table 114 is to be generated, an appropriate reset control policy may be selected. For example, during a process of starting the VMs by the management VM 120, a user may select an appropriate reset control policy. Further, for example, selection information for selecting the reset control policy to be applied may be included in the setting information that is to be referred to during the process of starting the VMs by the management VM 120, and the setting of the selection information is selectable. By doing this, he reset control policy to be applied may be changed (selectable).

In the following, an example is described where the reset management table 114 is generated based on the reset control policy (1) illustrated in FIG. 10A. Further, it is assumed that the reset management table 114 is generated for each of the operation target VMs.

Before the VMs are started, the management VM 120 generates the temporary reset management table 114 by referring to the VM configuration definition information 127 illustrated in FIGS. 6A and 6B and the VM access policy information 128 illustrated in FIG. 7.

First, the temporary reset management table 114 when the operation target VM is the guest VM (#1) 130a is generated.

As illustrated in the reset control policy (1) of FIG. 10A, in the case of the reset level "1", only the guest VM 130 of the operation target (i.e., the operation target VM) is included in the reset range.

In the reset management table 114 when the operation target VM is the guest VM (#1) 130a, as the data of the reset process target VM of the reset level "1", the management VM 120 registers (stores) data for the guest VM (#1) 130a, the data indicating that "VM-ID"=guest#1-vm, "the number of sharing"=0, and "start/stop state"=0.

As illustrated in the reset control policy (1) of FIG. 10A (and as described above), the reset range of the reset level "2" is (includes) the driver VM 140 used by the operation target VM in addition to the reset range of the reset level "1". According to the VM access policy information 128 illustrated in FIG. 7, the driver VMs 140 used by the guest VM (#1) 130a are the driver VM (LCD) 140a and the driver VM (NIC) 140b.

Further, according to the VM access policy information 128 illustrated in FIG. 7, the driver VM (LCD) 140a is shared by the guest VM (#1) 130a and the guest VM (#2) 130b. In the reset management table 114 when the operation target VM is the guest VM (#1) 130a, as the data of the reset process target VM of the reset level "2", the management VM 120 registers (stores) data for the driver VM (LCD) 140a, the data indicating that "VM-ID"=lcd-dev-vm, "the number of sharing"=2, and "start/stop state"=0.

Further, according to the VM access policy information 128 illustrated in FIG. 7, the driver VM (NIC) 140b is used by the guest VM (#1) 130a only. In the reset management table 114 when the operation target VM is the guest VM (#1) 130a, as the data of the reset process target VM of the reset level "2", the management VM 120 registers (stores) data for the driver VM (NIC) 140b, the data indicating that "VM-ID"=nic-dev-vm, "the number of sharing"=1, and "start/stop state"=0.

As illustrated in the reset control policy (1) of FIG. 10A (and as described above), the reset range of the reset level "3" is (includes) the guest VMs 130 sharing the driver VM 140 used by the operation target VM in addition to the reset ranges of the reset levels "1" and "2". According to the VM access policy information 128 illustrated in FIG. 7, the guest VM 130 sharing the driver VM (LCD) 140a along with the guest VM (#1) 130a is the guest VM (#2) 130b. Further, there is no guest VM 130 sharing the driver VM (NIC) 140b along with the guest VM (#1) 130a.

In the reset management table 114 when the operation target VM is the guest VM (#1) 130a, as the data of the reset process target VM of the reset level "3", the management VM 120 registers (stores) data for the guest VM (#2) 130b, the data indicating that "VM-ID"=guest#2-vm, "the number of sharing"=0, and "start/stop state"=0.

In the same manner, the temporary reset management table 114 when the operation target VM is the guest VM (#2) 130b is generated.

As illustrated in the reset control policy (1) of FIG. 10A, in the case of the reset level "1", only the guest VM 130 of the operation target (i.e., the operation target VM) is included in the reset range.

In the reset management table 114 when the operation target VM is the guest VM (#2) 130b, as the data of the reset process target VM of the reset level "1", the management VM 120 registers (stores) data for the guest VM (#2) 130b, the data indicating that "VM-ID"=guest#2-vm, "the number of sharing"=0, and "start/stop state"=0.

As illustrated in the reset control policy (1) of FIG. 10A (and as described above), the reset range of the reset level "2" is (includes) the driver VM 140 used by the operation target VM in addition to the reset range of the reset level "1". According to the VM access policy information 128 illustrated in FIG. 7, the driver VM 140 used by the guest VM (#2) 130b is the driver VM (LCD) 140a.

Further, according to the VM access policy information 128 illustrated in FIG. 7, the driver VM (LCD) 140a is shared by the guest VM (#1) 130a and the guest VM (#2) 130b. In the reset management table 114 when the operation target VM is the guest VM (#2) 130b, as the data of the reset process target VM of the reset level "2", the management VM 120 registers (stores) data for the driver VM (LCD) 140a, the data indicating that "VM-ID"=lcd-dev-vm, "the number of sharing"=2, and "start/stop state"=0.

As illustrated in the reset control policy (1) of FIG. 10A (and as described above), the reset range of the reset level "3" is (includes) the guest VMs 130 sharing the driver VM 140 used by the operation target VM in addition to the reset ranges of the reset levels "1" and "2". According to the VM access policy information 128 illustrated in FIG. 7, the guest VM 130 sharing the driver VM (LCD) 140a along with the guest VM (#2) 130b is the guest VM (#1) 130a.

In the reset management table 114 when the operation target VM is the guest VM (#2) 130b, as the data of the reset process target VM of the reset level "3", the management VM 120 registers (stores) data for the guest VM (#1) 130a, the data indicating that "VM-ID"=guest#1-vm, "the number of sharing"=0, and "start/stop state"=0.

FIGS. 11A and 11B are examples of the temporary reset management tables.

In the reset management tables 114, the data are divided for each of the operation target VMs. Specifically, FIG. 11A is a temporary reset management table 114a' in a case where the operation target VM is the guest VM (#1) 130a, the temporary reset management table 114a' being generated before the VMs have been started. Further, FIG. 11B is a temporary reset management table 114b' in a case where the operation target VM is the guest VM (#2) 130b, the temporary reset management table 114b' being generated before the VMs have been started.

By the processes described above performed before the VMs have been started, based on the VM configuration definition information 127 illustrated in FIGS. 6A and 6B and the VM access policy information 128 illustrated in FIG. 7, the temporary reset management tables 114a' and 114b' are generated.

After the temporary reset management tables are generated, the management VM 120 sequentially starts the VMs based on the VM start/stop order information 126 illustrated in FIG. 5B and by referring VM configuration definition information 127 illustrated in FIGS. 6A and 6B. Further, the management VM 120 detects the VMs that have successfully started and that are included in the VMs to be reset (reset target VMs), and sets the data indicating the start/stop state of the detected VMs to be "1". In this embodiment, it is assumed that the only VMs have been started are VMs to be controlled to be reset (reset control target VMs).

FIGS. 12A and 12B are examples of completed reset management tables (1).

Specifically, FIG. 12A is a reset management table 114a in a case where the operation target VM is the guest VM (#1) 130a, the reset management table 114a being generated after the VMs have been started. Further, FIG. 12B is a reset management table 114b in a case where the operation target VM is the guest VM (#2) 130b, the reset management table 114b being generated after the VMs have been started.

In a case where the reset control policy (1) of FIG. 10A is employed, the reset management tables 114a and 114b illustrated in FIGS. 12A and 12B are generated. The management VM 120 transmits the generated reset management tables 114a and 114b to the reset control VM 110.

FIGS. 13A and 13B are examples of completed reset management tables (2).

In a case where the reset control policy (2) of FIG. 10B is employed, based on the generation process of generating the reset management table 114 performed by the management VM 120, the reset management tables 114c and 114d illustrated in FIGS. 13A and 13B are generated. Specifically, FIG. 13A is a reset management table 114c in a case where the operation target VM is the guest VM (#1) 130a, the reset management table 114c being generated after the VMs have been started. Further, FIG. 13B is a reset management table 114d in a case where the operation target VM is the guest VM (#2) 130b, the reset management table 114b being generated after the VMs have been started.

In the case where the reset control policy (2) of FIG. 10B is employed, the reset range of the reset level "2" refers to the driver VM 140 that is used by the operation target VM alone in addition to the reset range of the reset level "1". Further, in the case where the reset control policy (2) of FIG. 10B is employed, the driver VM 140 that is shared by not only the operation target VM but also the other guest VMs 130 is included in the reset range of the reset level "3".

As illustrated in FIG. 13A, in the reset management table 114c when the operation target VM is the guest VM (#1) 130a, the driver VM (LCD) 140a shared along with the guest VM (#2) 130b is the reset process target VM of the reset level "3". Further, as illustrated in FIG. 13B, in the reset management table 114d when the operation target VM is the guest VM (#2) 130b, the driver VM (LCD) 140a shared along with the guest VM (#1) 130a is the reset process target VM of the reset level "3".

Figure 14:
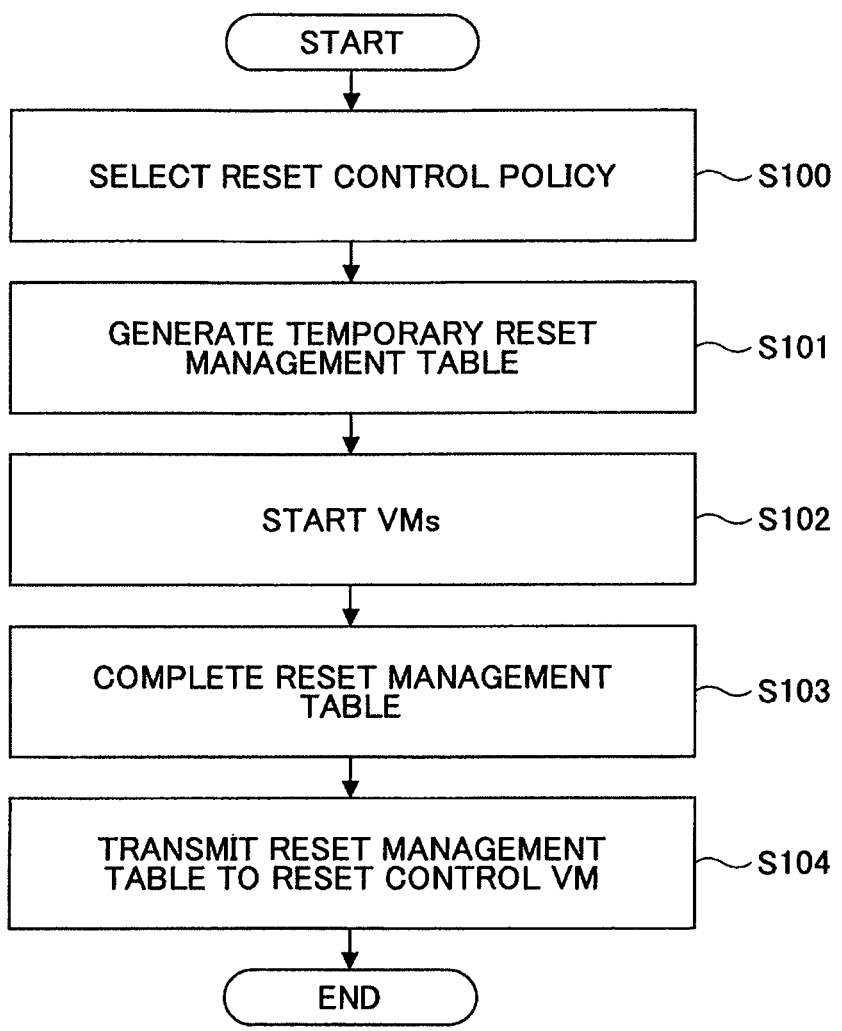
FIG. 14 is an example flowchart of dynamically generating the reset management table according to an embodiment of the preset invention.

FIG. 14 is a flowchart illustrating a process of dynamically generating the reset management table according to an embodiment of the present invention.

The process of dynamically generating the reset management table illustrated in FIG. 14 is performed by the management VM 120 when the management VM 120 has been started after the devices are initialized and the hypervisor 150 is loaded into the memory.

The management VM 120 selects the reset control policy to be applied to the generation of the reset management table 114 (step S100). When plural reset control policies are defined, for example, the management VM 120 selects the reset control policy set in the setting information which is to be referred to upon the VMs being started. On the other hand, for example, when only one reset control policy is defined, the process in step S100 is not necessary.

The management VM 120 performs a generation process of generating the temporary reset management table 114 (step S101). By performing this process, for example, based on the VM configuration definition information 127 illustrated in FIGS. 6A and 6B and the VM access policy information 128 illustrated in FIG. 7, the temporary reset management tables 114a' and 114b' as illustrated in FIGS. 11A and 11B are generated.

The management VM 120 performs a starting (booting) process on the VMs (step S102). For example, the VM control section 121 of the management VM 120 sequentially performs control to start the VMs including the driver VMs 140, the guest VMs 130, the reset control VM 110 and the like based on the VM start/stop order information 126 illustrated in FIG. 5B and by referring to VM configuration definition information 127 illustrated in FIGS. 6A and 6B. Further, the management VM 120 includes the management information (not shown in the mobile terminal 100 of FIG. 4.) managing the start/stop state (i.e., whether it is started (booted)) for each of the VMs.

The management VM 120 performs a completion process of completing the reset management table 114 (step S103). The management VM 120 completes the reset management table 114 by setting the start/stop state information in the temporary reset management table 114' based on the management information managing the start/stop state for each of the VMs. By performing this process the reset management tables 114a and 114b are completed.

The management VM 120 transmits the completed reset management tables 114a and 114b to the reset control VM 110 (step S104). In the reset control VM 110, the reset range control section 113 stores the reset management tables 114a and 114b.

As described above, it may become possible to dynamically generate the reset management table 114 depending on the configuration of and the dependency relationships among the VMs operating on the mobile terminal 100 and based on the defined reset control policy.

In the following, an example of the reset control process based on the generated reset management table 114 is described.

Figure 15:
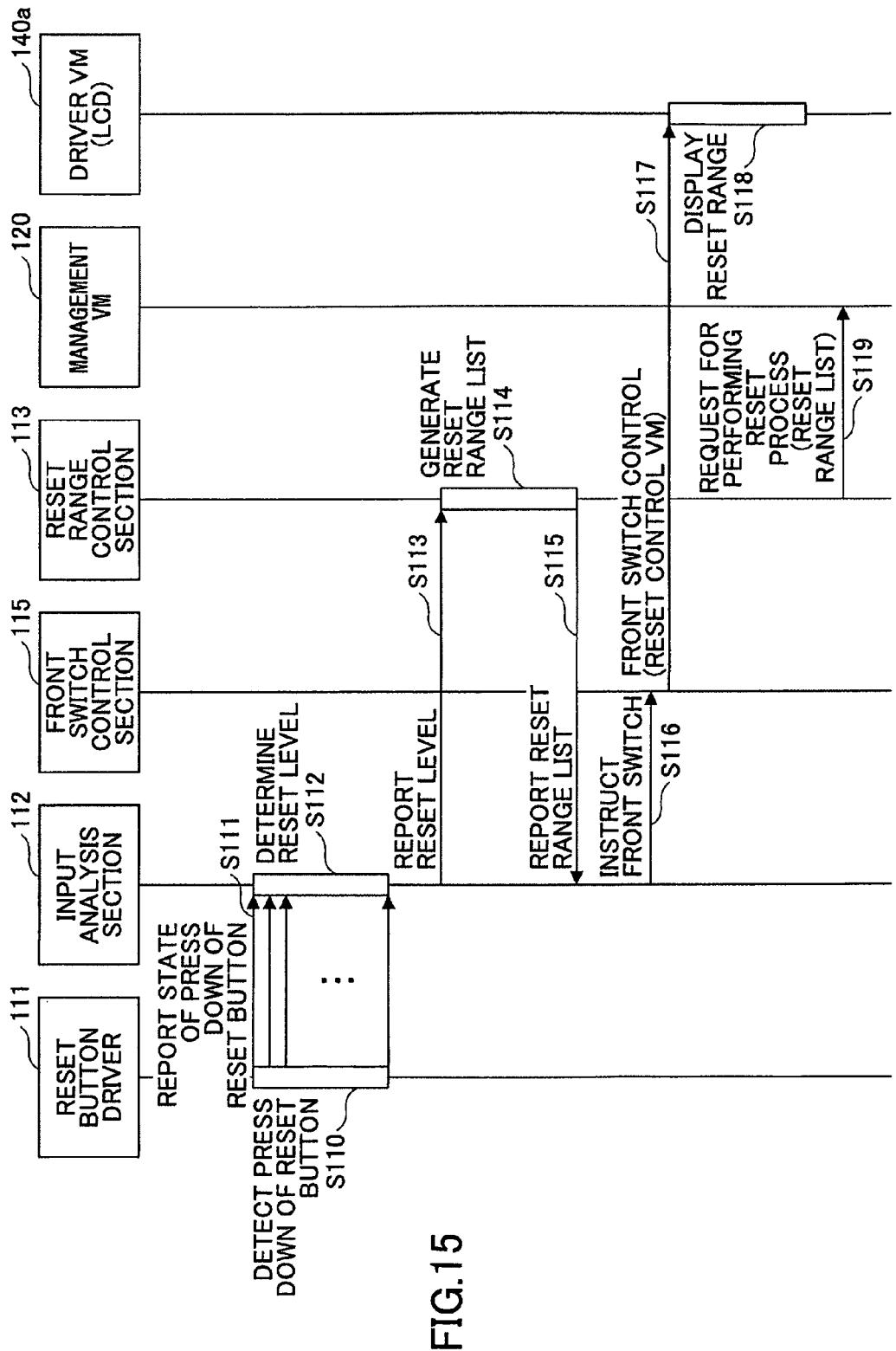
FIG. 15 is a sequence diagram of a reset control process according to an embodiment of the present invention.
Figure 16:
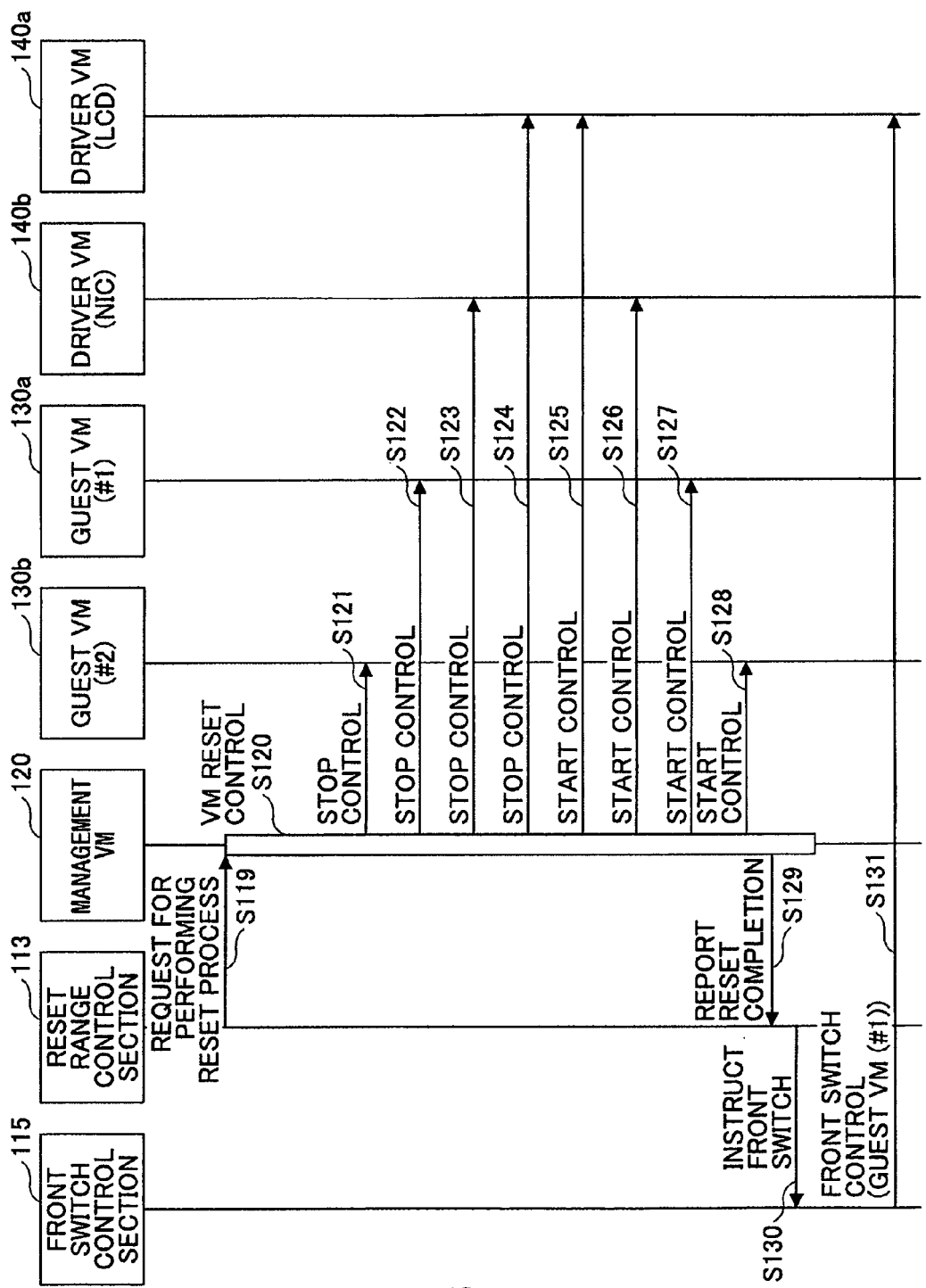
FIG. 16 is a sequence diagram of the reset control process according to the embodiment of the present invention.

FIGS. 15 and 16 collectively illustrates a sequence diagram of the reset control process according to an embodiment of the present invention.

The sequence diagram of FIGS. 15 and 16 illustrates an example of the reset control process where a user of the mobile terminal 100 determines that the guest VM (#1) 130a is being hung up and presses down the reset button 161, the guest VM (#1) 130a being displayed on the screen of the LCD 169 and being the operation target of the user. Further, herein, it is assumed that the reset management tables 114 stored in the reset range control section 113 are the reset management tables 114a and 114b as illustrated in FIGS. 12A and 12B.

In the mobile terminal 100, when the reset button 161 is pressed down by a user during the screen of the guest VM (#1) 130a which is the operation target of the user being displayed, the operation of pressing down the reset button 161 is detected by the reset button driver 111 (step S110). The reset button driver 111 reports the pressed state of the reset button 161 to the input analysis section 112 (step S111).

The input analysis section 112 analyzes the time period (pressed-down time period) while the reset button 161 is being pressed down based on the pressed state of the reset button 161 reported from the reset button driver 111. Based on the analysis result of the pressed-down time period of the reset button 161, the input analysis section 112 determines the reset level (step S112). In this example, it is assumed that the pressed-down time period of the reset button 161 pressed by the user is analyzed as "long" and that the reset level is determined to be "3". Further, the input analysis section 112 specifies the guest VM 130 which is the operation target of the user and obtains the VM-ID of the specified guest VM 130. In this example, as the guest VM 130 which is the operation target of the user, the guest VM (#1) 130a is specified and VM-ID "guest#1-vm" is obtained as the VM-ID of the guest VM (#1) 130a.

The input analysis section 112 reports the determined reset level and the specified the guest VM 130 which is the operation target of the user to the reset range control section 113 (step S113). In this example, the data of the reset level "3" and the VM-ID "guest#1-vm" are reported to the reset range control section 113.

The reset range control section 113 refers to the reset management table 114 based on the data of the reset level "3"

and the VM-ID "guest#1-vm" reported from the input analysis section 112, and generates a reset range list (step S114). Herein, the reset range list refers to a list including the guest VM 130 which is the operation target of the user (i.e., the operation target VM) and the reset process target VMs corresponding to the reset level. In this example, based on the reset management table 114a illustrated in FIG. 12A, a list including the VM-ID "guest#1-vm" as the operation target VM and the VM-ID "guest#1-vm", "lcd-dev-vm", "nic-dev-vm", and "guest#2-vm" as the reset process target VMs corresponding to the reset level is generated.

As a response to the input analysis section 112, the reset range control section 113 reports the generated reset range list to the input analysis section 112 (step S115).

The input analysis section 112 issues front switch instructions to the front switch control section 115 (step S116). The front switch instructions are instructions to switch the front-end driver from the LCD driver (front end) 131 of the guest VM 130 which is the operation target of the user to the LCD driver (front end) 116 of the reset control VM 110.

The front switch control section 115 accesses the driver VM (LCD) 140a via the LCD driver (front end) 116 and performs control to switch the front-end driver to the LCD driver (front end) 116 of the reset control VM 110 (step S117). In this case, the reset control VM 110 transmits a request for displaying the reset range on a screen display from the LCD driver (front end) 116 to the LCD driver (back end) 141 of the driver VM (LCD) 140a.

In response to the request from the LCD driver (front end) 116 of the reset control VM 110, the LCD driver (back end) 141 of the driver VM (LCD) 140a controls the LCD 169 so as to display the reset range on a screen of the display of the LCD 169 (step S118).

In this case, the content of the reset range displayed on the LCD 169 may be a list of VN names of the reset process target VMs. Otherwise, for example, the reset range may be displayed in a manner such that a figure illustrating the configuration of the VMs (reset process target VMs) is used. Further, if the LCD 169 is a touch panel-equipped display, by touching the reset range displayed on the screen of the LCD 169 by a user, more detailed information of the reset range may be further displayed. Further, in response to an operation where a user alternately presses and releases the reset button 161, the reset ranges corresponding to the reset levels "1" through "3" may be sequentially displayed on the LCD 196. By displaying in this way, it may become possible for the user to designate (select) the reset range by checking whether the desired reset range is designated on the screen of the LCD 169.

Further, the reset range control section 113 transmits the data of the reset range list indicating a reset target range to the VM control section 121 of the management VM 120, requesting the VM control section 121 to perform the reset process (step S119). In the example, the data of the reset range list (i.e., the VM-ID "guest#1-vm", "lcd-dev-vm", "nic-dev-vm", and "guest#2-vm") are transmitted to the VM control section 121 of the management VM 120.

The VM control section 121 of the management VM 120 performs the reset control on the VMs included in the reset range list based on the order described in the VM start/stop order information 126 stored in the VM start/stop order management section 122 (step S120). Herein, it is assumed that the reset of the VMs is performed by stopping and restarting the VMs.

First, the VM control section 121 performs stop control to stop the VMs included in the reset range list. Herein, the VM control section 121 refers to the VM start/stop order information 126 illustrated in FIG. 5A and FIG. 5B, and performs stop control on the VMs included in the reset range list in the order opposite to the starting order of the VMs indicated in the VM start/stop order information 126. Namely, in this example, the VM control section 121 performs stop control on the VMs in the order of the guest VM (#2) 130b (step S121), the guest VM (#1) 130a (step S122), the driver VM (NIC) 140b (step S123), and the driver VM (LCD) 140a (step S124).

After the stop of the VMs is completed, the VM control section 121 performs start control to start the VMs included in the reset range list. Herein, the VM control section 121 refers to the VM start/stop order information 126 illustrated in FIG. 5A and FIG. 5B, and performs start control on the VMs included in the reset range list in the starting order of the VMs indicated in the VM start/stop order information 126. Namely, the VM control section 121 performs start control on the VMs in the order of the driver VM (LCD) 140a (step S125), the driver VM (NIC) 140b (step S126), the guest VM (#1) 130a (step S127), and the guest VM (#2) 130b (step S128).

After the start of the VMs is completed, the VM control section 121 of the management VM 120 reports the completion of the reset to the reset range control section 113 of the reset control VM 110 (step S129).

The reset range control section 113 issues the front switch instructions to the front switch control section 115 (step S130). The front switch instructions are instructions to switch the front-end driver from the LCD driver (front end) 116 of the reset control VM 110 to the LCD driver (front end) 131 of the guest VM 130 which is originally the operation target of the user.

The front switch control section 115 accesses the driver VM (LCD) 140a via the LCD driver (front end) 116 and performs control to switch the front-end driver to the LCD driver (front end) 131 of the guest VM 130 which is the original operation target of the user (step S131). In this case, the front-end driver is switched to the LCD driver (front end) 131 of the guest VM 130.

By doing as described above, the reset control performed by the reset control VM 110 using the reset management table 114 is completed.

Figure 17:
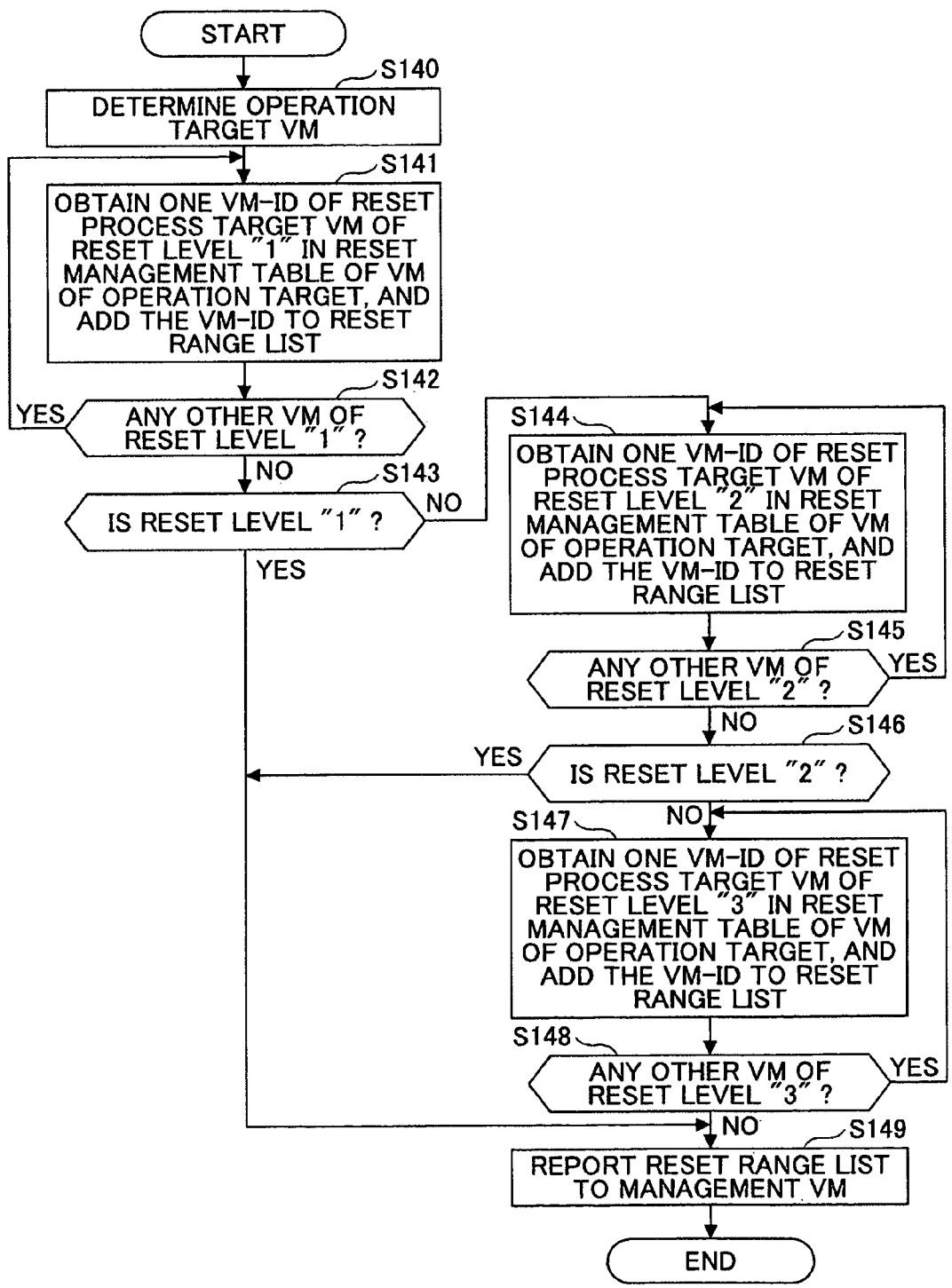
FIG. 17 is an example flowchart of a reset range list generation process by a reset range control section according to an embodiment of the present invention.

FIG. 17 is a flowchart illustrating a reset range list generation process of generating the reset range list performed by the reset range control section 113 according to an embodiment of the present invention.

The reset range control section 113 determines the operation target VM (step S140). The report received by the reset range control section 113 from the input analysis section 112 includes the VM-ID of the guest VM 130 which is the operation target, the VM-ID being specified by the input analysis section 112, (i.e., the VM-ID of the operation target VM) and the reset level determined by the input analysis section 112.

The reset range control section 113 obtains one VM-ID of the reset process target VM corresponding to the reset level "1" in the reset management table 114 and adds the obtained VM-ID to the reset range list (step S141).

The reset range control section 113 determines whether there is a residual reset process target VM corresponding to the reset level "1" in the reset management table 114 (step S142).

When determining that there is the residual reset process target VM corresponding to the reset level "1" in the reset management table 114 (YES in step S142), the process goes back to step S141, where the reset range control section 113 performs the process on the next reset process target VM.

When determining that there is no residual reset process target VM corresponding to the reset level "1" in the reset management table 114 (NO in step S142), the reset range control section 113 determines whether the reset level determined by the input analysis section 112 is "1" (step S143).

When determining that the reset level determined by the input analysis section 112 is "1" (YES in step S143), the reset range list is completed at this point. The reset range control section 113 reports the reset range list to the VM control section 121 of the management VM 120 (step S149).

When determining that the reset level determined by the input analysis section 112 is other than "1" (NO in step S143), in other words when the reset level is "2" or "3", the reset range control section 113 obtains one VM-ID of the reset process target VM corresponding to the reset level "2" in the reset management table 114 and adds the obtained VM-ID to the reset range list (step S144).

The reset range control section 113 determines whether there is a residual reset process target VM corresponding to the reset level "2" in the reset management table 114 (step S145).

When determining that there is the residual reset process target VM corresponding to the reset level "2" in the reset management table 114 (YES in step S145), the process goes back to step S144, where the reset range control section 113 performs the process on the next reset process target VM.

When determining that there is no residual reset process target VM corresponding to the reset level "2" in the reset management table 114 (NO in step S145), the reset range control section 113 determines whether the reset level determined by the input analysis section 112 is "2" (step S146).

When determining that the reset level determined by the input analysis section 112 is "2" (YES in step S146), the reset range list is completed at this point. The reset range control section 113 reports the reset range list to the VM control section 121 of the management VM 120 (step S149).

When determining that the reset level determined by the input analysis section 112 is not "2" (NO in step S146), in other words when the reset level is "3", the reset range control section 113 obtains one VM-ID of the reset process target VM corresponding to the reset level "3" in the reset management table 114 and adds the obtained VM-ID to the reset range list (step S147).

The reset range control section 113 determines whether there is a residual reset process target VM corresponding to the reset level "3" in the reset management table 114 (step S148).

When determining that there is the residual reset process target VM corresponding to the reset level "3" in the reset management table 114 (YES in step S148), the process goes back to step S147, where the reset range control section 113 performs the process on the next reset process target VM.

When determining that there is no residual reset process target VM corresponding to the reset level "3" in the reset management table 114 (NO in step S145), the reset range list is completed at this point. The reset range control section 113 reports the reset range list to the VM control section 121 of the management VM 120 (step S149).

In the following, specific examples of the reset control in accordance to the reset operation performed by a user are described with reference to several VM configurations.

Example 1

Figure 18:
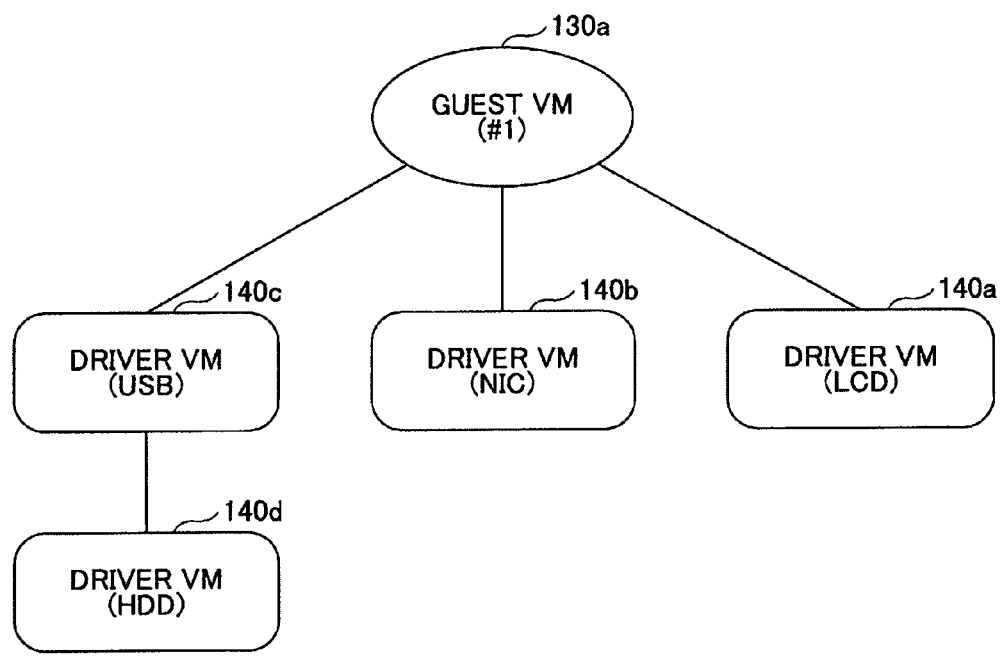
FIG. 18 illustrates an example configuration of the VMs according to a first embodiment of the present invention.

In example 1, a case is described where there is one guest VM 130 and several driver VMs 140 that are used by the guest VM 130 with reference to FIGS. 18 through 20.

FIG. 18 is an example configuration of the VMs (VM configuration) of example 1.

As schematically illustrated in the VM configuration illustrated in FIG. 18, the guest VM (#1) 130a is connected to the LCD 169 and NIC 168 via the driver VM (LCD) 140a and the driver VM (NIC) 140b, respectively. Further, the guest VM (#1) 130a is connected to the HDD via a driver VM (USB) 140c and a driver VM (HDD) 140d.

FIG. 19 is an example of the reset management table 114e of example 1.

In the reset management table 114e illustrated in FIG. 19, the operation target VM is the guest VM (#1) 130a. Further, the reset management table 114e illustrated in FIG. 19 is generated based on the VM configuration and an order relationship (described below) as illustrated in FIG. 18. Further, the reset management table 114e illustrated in FIG. 19 is generated in the same manner whether based on the reset control policy (1) illustrated in FIG. 10A or based on the reset control policy (2) illustrated in FIG. 10B. In the reset management table 114e illustrated in FIG. 19, the reset process target VMs are described using the corresponding VM names.

Further, when there is the order relationship, the reset management table 114e in accordance with the order relationship is generated. In the example of the VM configuration illustrated in FIG. 18, among the guest VM (#1) 130a, the driver VM (USB) 140c, and the driver VM (HDD) 140d, there is an order relationship: guest VM (#1) 130a→driver VM (USB) 140c→driver VM (HDD) 140d. Herein, it is assumed that any of the reset control policies (1) and (2) in FIGS. 10A and 10B is defined in a manner such that, when there is a device connected via a connection terminal, the driver VM for the connection terminal is the reset process target VM having a higher reset level than that of the driver VM 140 for the device by one level when it is possible.

FIGS. 20A through 20F are examples of display screens guiding the respective reset ranges in example 1.

Namely, FIGS. 20A through 20F are examples of displays displaying the respective reset ranges displayed on LCD 169 for a user in example 1.

Figure 20A:
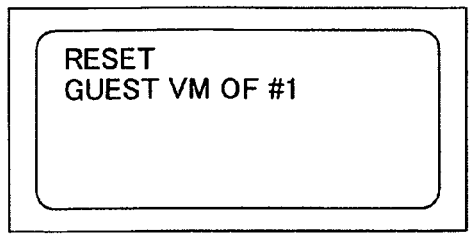
FIGS. 20A through 20F illustrate examples of display screens indicating the respective reset ranges according to the first embodiment of the present invention.
Figure 20B:
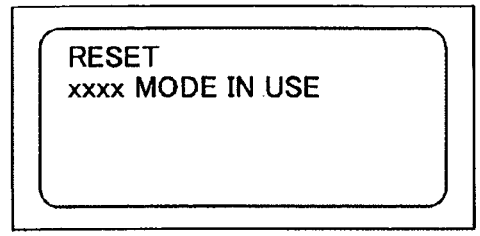
Figure 20C:
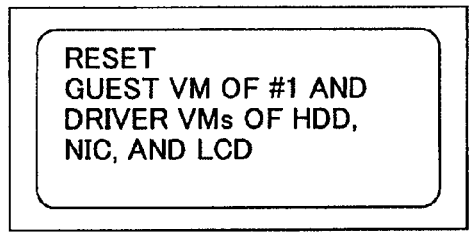
Figure 20D:
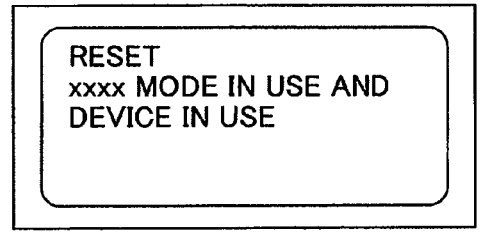
Figure 20E:
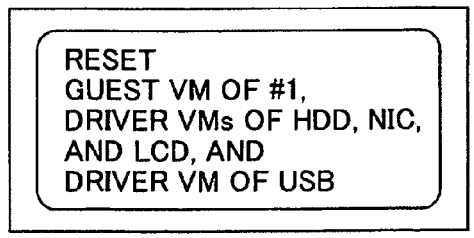
Figure 20F:
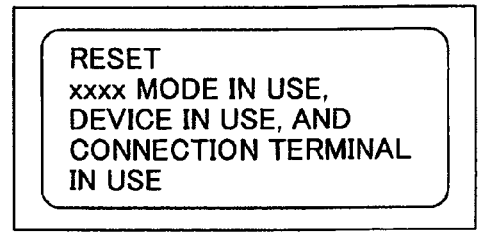

Specifically, FIG. 20A is an example of a display screen displaying the reset range using the VM names when the length (time period) of the pressing down operation of the reset button 161 by a user is "short". FIG. 20B is an example of a display screen displaying the reset range using a system name of the VM when the length (time period) of the pressing down operation of the reset button 161 by a user is "short". FIG. 20C is an example of a display screen displaying the reset range using the VM names when the length (time period) of the pressing down operation of the reset button 161 by a user is "middle". FIG. 20D is an example of a display screen displaying the reset range using the system names of the VMs when the length (time period) of the pressing down operation of the reset button 161 by a user is "middle". FIG. 20E is an example of a display screen displaying the reset range using the VM names when the length (time period) of the pressing down operation of the reset button 161 by a user is "long". FIG. 20F is an example of a display screen displaying the reset range using the system names of the VMs when the length (time period) of the pressing down operation of the reset button 161 by a user is "long".

In the following, a specific example of generating a reset range list performed by the reset range control section 113 in example 1 is described. Further, in the description below, the step numbers in parentheses denote the respective step numbers of the process in the flowchart illustrated in FIG. 17.

In the VM configuration illustrated in FIG. 18, the VM that could be the operation target VM is the guest VM (#1) 130a only. Therefore, the reset management table 114 to be referred to by the reset range control section 113 is limited to the reset management table 114*e* (see FIG. 19) corresponding to a case where the operation target VM is the guest VM (#1) 130*a*.

First, a case is described where the length (time period) of the pressing down operation of the reset button 161 by a user is "short". As a result of the determination that the length of the pressing down operation of the reset button 161 by a user is "short", it is determined that the reset level instructed by the user is "1".

The reset range control section 113 obtains the VM-ID of the guest VM (#1) 130*a* that is the first reset process target VM in the reset level "1" from the reset management table 114*e*, and generate the reset range list (step S141).

The reset range control section 113 determines (confirms) that the data of the next reset process target VM in the reset level "1" is none (i.e., "null") in the reset management table 114*e* (NO in step S142).

The reset range control section 113 determines that the reset level instructed by the user is "1" (YES in step S143). At this point, the reset range list is completed. In the completed reset range list, only the guest VM (#1) 130*a* is recorded as the reset process target VM.

FIG. 20A is a screen example displaying the reset range using the VM name on the display of the LCD 169. On the other hand, FIG. 20B is a screen example displaying the reset range using the system name of the VM on the display of the LCD 169. The "xxxx mode" in FIG. 20B denotes the system name of the guest VM (#1) 130*a*.

The reset range control section 113 reports the completed reset range list to the management VM 120 (step S149). The management VM 120 performs the reset process on the guest VM (#1) 130*a* recorded in the reset range list. Therefore, it may become possible to perform the reset process only on the guest VM (#1) 130*a*.

Next, a case is described where the length (time period) of the pressing down operation of the reset button 161 by a user is "middle". As a result of the determination that the length of the pressing down operation of the reset button 161 by a user is "middle", it is determined that the reset level instructed by the user is "2".

The processes up to the process of recording the reset process target VM of the reset level "1" into the reset range list (i.e., up to NO in step S142) are the same as those in the above case where the length of the pressing down operation of the reset button 161 by a user is "short". Therefore, the repeated description is herein omitted.

After the process of recording the reset process target VM of the reset level "1" into the reset range list (NO in step S142), the reset range control section 113 determines that the reset level instructed by the user is "2" (NO in step S143).

The reset range control section 113 obtains the VM-ID of the driver VM (HDD) 140*d* that is the first reset process target VM in the reset level "2" from the reset management table 114*e*, and adds the obtained VM-ID to the reset range list (step S144).

The reset range control section 113 obtains the VM-ID of the driver VM (NIC) 140*b* that is the next reset process target VM in the reset level "2" from the reset management table 114*e*, and adds the obtained VM-ID to the reset range list (step S144).

The reset range control section 113 obtains the VM-ID of the driver VM (LCD) 140*a* that is the next reset process target VM in the reset level "2" from the reset management table 114*e*, and adds the obtained VM-ID to the reset range list (step S144).

The reset range control section 113 determines that the data of the next reset process target VM in the reset level "2" is none (i.e., "null") in the reset management table 114*e* (NO in step S145).

The reset range control section 113 determines that the reset level instructed by the user is "2" (YES in step S146). At this point, the reset range list is completed. In the completed reset range list, the guest VM (#1) 130*a*, the driver VM (HDD) 140*d*, the driver VM (NIC) 140*b*, and the driver VM (LCD) 140*a* are recorded as the reset process target VMs.

FIG. 20C is a screen example displaying the reset range using the VM names on the display of the LCD 169. On the other hand, FIG. 20D is a screen example displaying the reset range using the system name of the VM on the display of the LCD 169. Further, in FIG. 20D, the "device" on the screen display may be designated by a user so that the a list of the driver VMs 140 that are the reset process target VMs may be displayed.

The reset range control section 113 reports the completed reset range list to the management VM 120 (step S149). The management VM 120 performs the reset process on the guest VM (#1) 130*a*, the driver VM (HDD) 140*d*, the driver VM (NIC) 140*b*, and the driver VM (LCD) 140*a* recorded in the reset range list. Therefore, it may become possible to perform the reset process only on the guest VM (#1) 130*a*, the driver VM (HDD) 140*d*, the driver VM (NIC) 140*b*, and the driver VM (LCD) 140*a*.

Next, a case is described where the length (time period) of the pressing down operation of the reset button 161 by a user is "long". As a result of the determination that the length of the pressing down operation of the reset button 161 by a user is "long", it is determined that the reset level instructed by the user is "3".

The processes up to the process of recording the reset process target VMs of the reset level "2" into the reset range list (i.e., up to NO in step S145) are the same as those in the above case where the length of the pressing down operation of the reset button 161 by a user is "middle". Therefore, the repeated description is herein omitted.

After the process of recording the reset process target VM of the reset level "2" into the reset range list (NO in step S145), the reset range control section 113 determines that the reset level instructed by the user is "3" (NO in step S146).

The reset range control section 113 obtains the VM-ID of the driver VM (USB) 140*c* that is the first reset process target VM in the reset level "3" from the reset management table 114*e*, and adds the obtained VM-ID to the reset range list (step S147).

The reset range control section 113 determines that the data of the next reset process target VM in the reset level "3" is none (i.e., "null") in the reset management table 114*e* (NO in step S148). At this point, the reset range list is completed. In the completed reset range list, the guest VM (#1) 130*a*, the driver VM (HDD) 140*d*, the driver VM (NIC) 140*b*, the driver VM (LCD) 140*a*, and the driver VM (USB) 140*c* are recorded as the reset process target VMs.

FIG. 20E is a screen example displaying the reset range using the VM names on the display of the LCD 169. On the other hand, FIG. 20F is a screen example displaying the reset range using the system name of the VM on the display of the LCD 169.

The reset range control section 113 reports the completed reset range list to the management VM 120 (step S149). The management VM 120 performs the reset process on the guest VM (#1) 130*a*, the driver VM (HDD) 140*d*, the driver VM (NIC) 140*b*, the driver VM (LCD) 140*a*, and the driver VM (USB) 140*c* recorded in the reset range list. Therefore, it may become possible to perform the reset process only on the guest VM (#1) 130*a*, the driver VM (HDD) 140*d*, the driver VM (NIC) 140*b*, the driver VM (LCD) 140*a*, and the driver VM (USB) 140*c*.

Example 2

Figure 21:
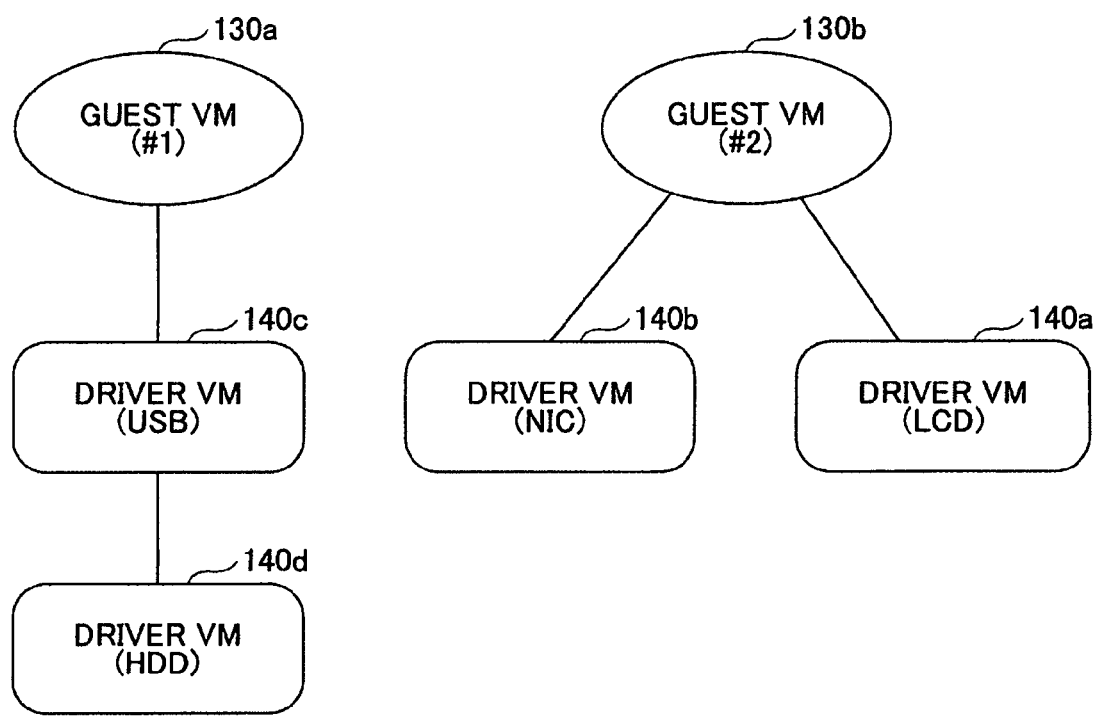
FIG. 21 illustrates an example configuration of the VMs according to a second embodiment of the present invention.

In example 2, a case is described where there are two guest VMs 130 and several driver VMs 140 that are used by the guest VMs 130 with reference to FIGS. 21 through 23.

FIG. 21 is an example configuration of the VMs (VM configuration) of example 1.

As schematically illustrated in the VM configuration illustrated in FIG. 21, the guest VM (#1) 130*a* is connected to the HDD 164 via the driver VM (USB) 140*c* and the driver VM (HDD) 140*d*, the driver VM (USB) 140*c* being a driver for the USB connection terminal 163.

Further, the guest VM (#2) 130*b* is connected to the LCD 169 and NIC 168 via the driver VM (LCD) 140*a* and the driver VM (NIC) 140*b*, respectively. Further, the guest VM (#1) 130*a* is connected to the HDD via a driver VM (USB) 140*c* and a driver VM (HDD) 140*d*.

FIGS. 22A and 22B are examples of the reset management tables 114*f* and 114*g* of example 2.

The reset management tables 114*f* and 114*g* illustrated in FIGS. 22A and 22B are generated based on the dependency relationships and the order relationships in the VM configuration illustrated in FIG. 21. FIG. 22A illustrates the reset management table 114*f* in a case where the operation target VM is the guest VM (#1) 130*a*. On the other hand, FIG. 22B illustrates the reset management table 114*g* in a case where the operation target VM is the guest VM (#2) 130*b*. Further, the reset management tables 14*f* and 114*g* illustrated in FIGS. 20A and 20B are generated in the same manner whether based on the reset control policy (1) illustrated in FIG. 10A or based on the reset control policy (2) illustrated in FIG. 10B. In the reset management tables 14*f* and 114*g* illustrated in FIGS. 20A and 20B, the reset process target VMs are described using the corresponding VM names.

FIGS. 23A through 23F are examples of display screens guiding the respective reset ranges in example 2.

Namely, FIGS. 20A through 20F are examples of displays displaying the respective reset ranges displayed on LCD 169 for a user in example 2. Herein, those examples displayed on the LCD 169 indicate the reset ranges obtained from the reset management table 114*g* illustrated in FIG. 22B in a case where the operation target VM is the guest VM (#2) 130*b*.

Figure 23A:
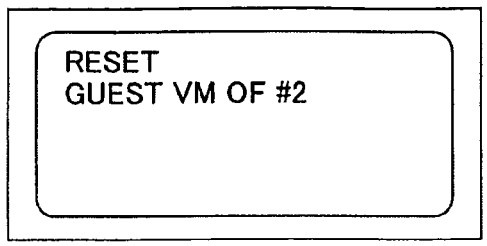
FIGS. 23A through 23F illustrate examples of display screens indicating the respective reset ranges according to the second embodiment of the present invention.
Figure 23B:
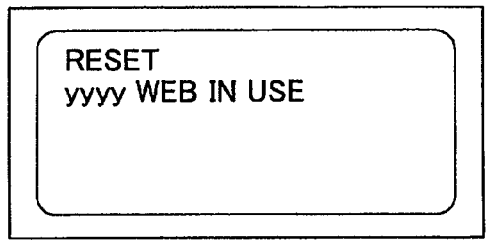
Figure 23C:
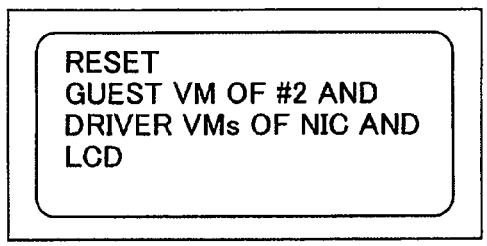
Figure 23D:
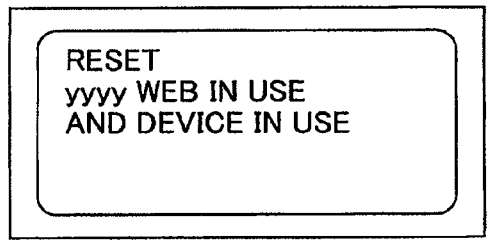
Figure 23E:
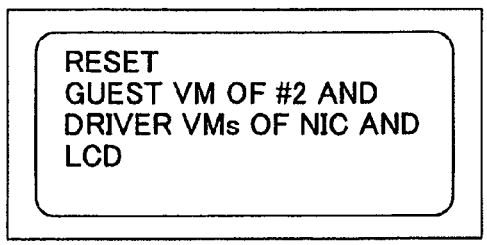
Figure 23F:
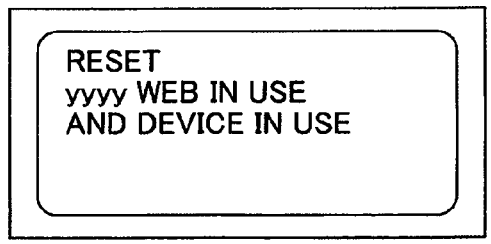

Specifically, FIG. 23A is an example of a display screen displaying the reset range using the VM name when the length (time period) of the pressing down operation of the reset button 161 by a user is "short". FIG. 23B is an example of a display screen displaying the reset range using a system name of the VM when the length (time period) of the pressing down operation of the reset button 161 by a user is "short". FIG. 23C is an example of a display screen displaying the reset range using the VM names when the length (time period) of the pressing down operation of the reset button 161 by a user is "middle". FIG. 23D is an example of a display screen displaying the reset range using the system names of the VMs when the length (time period) of the pressing down operation of the reset button 161 by a user is "middle". FIG. 23E is an example of a display screen displaying the reset range using the VM names when the length (time period) of the pressing down operation of the reset button 161 by a user is "long". FIG. 23F is an example of a display screen displaying the reset range using the system names of the VMs when the length (time period) of the pressing down operation of the reset button 161 by a user is "long".

In the following, a specific example of generating a reset range list performed by the reset range control section 113 in example 2 is described. Further, in the description below, the step numbers in parentheses denote the respective step numbers of the process in the flowchart illustrated in FIG. 17.

Herein, in the VM configuration illustrated in FIG. 21, it is assumed that the operation target VM is the guest VM (#2) 130*b*. Therefore, the reset management table 114 to be referred to by the reset range control section 113 is the reset management table 114*g* (see FIG. 22B) corresponding to a case where the operation target VM is the guest VM (#2) 130*b*.

First, a case is described where the length (time period) of the pressing down operation of the reset button 161 by a user is "short". As a result of the determination that the length of the pressing down operation of the reset button 161 by a user is "short", it is determined that the reset level instructed by the user is "1".

The reset range control section 113 obtains the VM-ID of the guest VM (#2) 130*b* that is the first reset process target VM in the reset level "1" from the reset management table 114*g*, and generate the reset range list (step S141).

The reset range control section 113 determines (confirms) that the data of the next reset process target VM in the reset level "1" is none (i.e., "null") in the reset management table 114*g* (NO in step S142).

The reset range control section 113 determines that the reset level instructed by the user is "1" (YES in step S143). At this point, the reset range list is completed. In the completed reset range list, only the guest VM (#2) 130*b* is recorded as the reset process target VM.

FIG. 23A is a screen example displaying the reset range using the VM name on the display of the LCD 169. On the other hand, FIG. 23B is a screen example displaying the reset range using the system name of the VM on the display of the LCD 169. The "yyyy web" in FIG. 23B denotes the system name of the guest VM (#2) 130*b*.

The reset range control section 113 reports the completed reset range list to the management VM 120 (step S149). The management VM 120 performs the reset process on the guest VM (#2) 130*b* recorded in the reset range list. Therefore, it may become possible to perform the reset process only on the guest VM (#2) 130*b*.

Next, a case is described where the length (time period) of the pressing down operation of the reset button 161 by a user is "middle". As a result of the determination that the length of the pressing down operation of the reset button 161 by a user is "middle", it is determined that the reset level instructed by the user is "2".

The processes up to the process of recording the reset process target VM of the reset level "1" into the reset range list (i.e., up to NO in step S142) are the same as those in the above case where the length of the pressing down operation of the reset button 161 by a user is "short". Therefore, the repeated description is herein omitted.

After the process of recording the reset process target VM of the reset level "1" into the reset range list (NO in step S142), the reset range control section 113 determines that the reset level instructed by the user is "2" (NO in step S143).

The reset range control section 113 obtains the VM-ID of the driver VM (NIC) 140*b* that is the first reset process target VM in the reset level "2" from the reset management table 114*g*, and adds the obtained VM-ID to the reset range list (step S144).

The reset range control section 113 obtains the VM-ID of the driver VM (LCD) 140a that is the next reset process target VM in the reset level "2" from the reset management table 114g, and adds the obtained VM-ID to the reset range list (step S144).

The reset range control section 113 determines that the data of the next reset process target VM in the reset level "2" is none (i.e., "null") in the reset management table 114e (NO in step S145).

The reset range control section 113 determines that the reset level instructed by the user is "2" (YES in step S146). At this point, the reset range list is completed. In the completed reset range list, the guest VM (#2) 130b, the driver VM (NIC) 140b, and the driver VM (LCD) 140a are recorded as the reset process target VMs.

FIG. 23C is a screen example displaying the reset range using the VM names on the display of the LCD 169. On the other hand, FIG. 23D is a screen example displaying the reset range using the system name of the VM on the display of the LCD 169.

The reset range control section 113 reports the completed reset range list to the management VM 120 (step S149). The management VM 120 performs the reset process on the guest VM (#2) 130b, the driver VM (NIC) 140b, and the driver VM (LCD) 140a recorded in the reset range list. Therefore, it may become possible to perform the reset process only on the guest VM (#2) 130b, the driver VM (NIC) 140b, and the driver VM (LCD) 140a.

Next, a case is described where the length (time period) of the pressing down operation of the reset button 161 by a user is "long". As a result of the determination that the length of the pressing down operation of the reset button 161 by a user is "long", it is determined that the reset level instructed by the user is "3".

The processes up to the process of recording the reset process target VMs of the reset level "2" into the reset range list (i.e., up to NO in step S145) are the same as those in the above case where the length of the pressing down operation of the reset button 161 by a user is "middle". Therefore, the repeated description is herein omitted.

After the process of recording the reset process target VM of the reset level "2" into the reset range list (NO in step S145), the reset range control section 113 determines that the reset level instructed by the user is "3" (NO in step S146).

The reset range control section 113 determines that the data of the first reset process target VM in the reset level "3" is none (i.e., "null") in the reset management table 114g (NO in step S148). At this point, the reset range list is completed. In the completed reset range list, the guest VM (#2) 130b, the driver VM (NIC) 140b, and the driver VM (LCD) 140a are recorded as the reset process target VMs.

FIG. 23E is a screen example displaying the reset range using the VM names on the display of the LCD 169. On the other hand, FIG. 23F is a screen example displaying the reset range using the system name of the VMs on the display of the LCD 169.

The reset range control section 113 reports the completed reset range list to the management VM 120 (step S149). The management VM 120 performs the reset process on the guest VM (#2) 130b, the driver VM (NIC) 140b, and the driver VM (LCD) 140a recorded in the reset range list. Therefore, it may become possible to perform the reset process only on the guest VM (#2) 130b, the driver VM (NIC) 140b, and the driver VM (LCD) 140a.

In example 2, there is no reset process target VM corresponding to the reset level "3" in the reset management table 114g illustrated in FIG. 22B when the operation target VM is the guest VM (#2) 130b. Therefore, the generation result of the reset range list when the length of the pressing down operation of the reset button 161 by a user is "middle" is that same as the generation result of the reset range list when the length of the pressing down operation of the reset button 161 by a user is "long".

Example 3

In example 3, a case is described where there two guest VMs 130 and several driver VMs 140 that are used by the guest VMs 130 with reference to FIGS. 24 through 27. It should be noted that in the VM configuration of example 3 there exists a driver VM 140 that is shared by two guest VMs 130.

Figure 24:
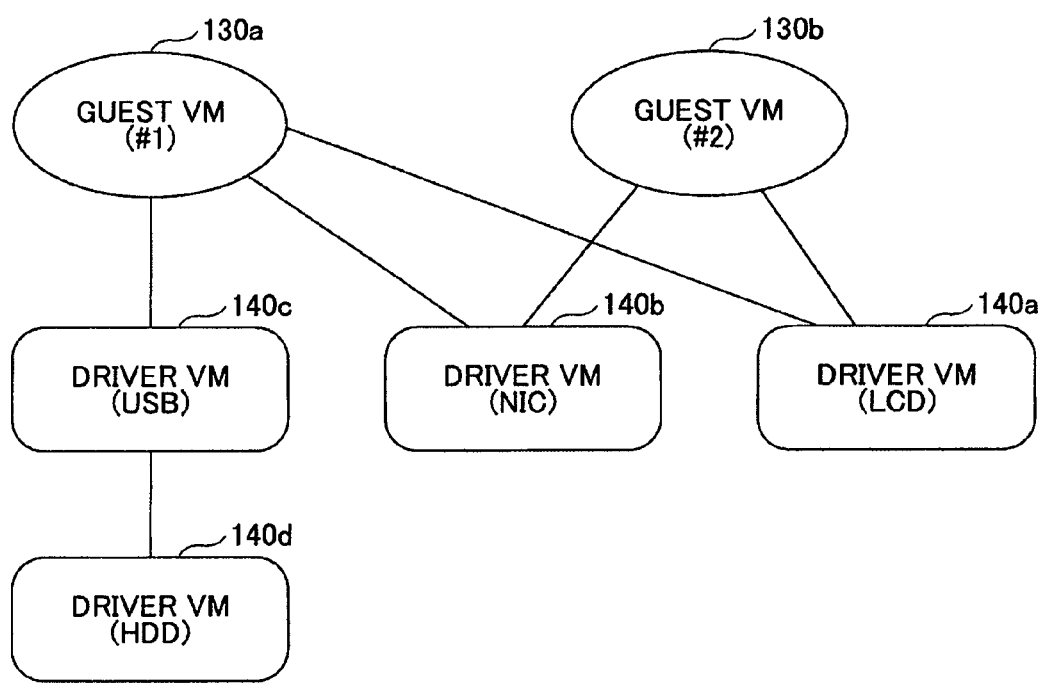
FIG. 24 illustrates an example configuration of the VMs according to a third embodiment of the present invention.

FIG. 24 is an example configuration of the VMs (VM configuration) of example 3.

As schematically illustrated in the VM configuration illustrated in FIG. 24, the guest VM (#1) 130a is connected to the LCD 169 and NIC 168 via the driver VM (LCD) 140a and the driver VM (NIC) 140b, respectively. Further, the guest VM (#1) 130a is connected to the HDD 164 via the driver VM (USB) 140c and the driver VM (HDD) 140d, the driver VM (USB) 140c being the driver for the USB connection terminal 163.

Further, the guest VM (#2) 130b is connected to the LCD 169 and NIC 168 via the driver VM (LCD) 140a and the driver VM (NIC) 140b, respectively.

In the VM configuration illustrated in FIG. 24, each of the driver VM (LCD) 140a and the driver VM (NIC) 140b is shared by the guest VM (#1) 130a and the guest VM (#2) 130b.

FIGS. 25A and 25B are examples of the reset management tables (1) 114h and 114i of example 3.

The reset management tables 114h and 114i illustrated in FIGS. 25A and 25B are generated based on the dependency relationships and the order relationships in the VM configuration illustrated in FIG. 24 and based on the reset control policy (1) illustrated in FIG. 10A. In the reset management table 114h illustrated in FIG. 25A, the operation target VM is the guest VM (#1) 130a. On the other hand, in the reset management table 114i illustrated in FIG. 25B, the operation target VM is the guest VM (#2) 130b. Further, in the reset management tables 114h and 114i illustrated in FIGS. 25A and 25B, the reset process target VMs are described using the corresponding VM names.

FIGS. 26A and 26B are examples of the reset management tables (2) 114j and 114k of example 3.

The reset management tables 114j and 114k illustrated in FIGS. 26A and 26B are generated based on the dependency relationships and the order relationships in the VM configuration illustrated in FIG. 24 and based on the reset control policy (2) illustrated in FIG. 10B. In the reset management table 114j illustrated in FIG. 26A, the operation target VM is the guest VM (#1) 130a. On the other hand, in the reset management table 114k illustrated in FIG. 26B, the operation target VM is the guest VM (#2) 130b. Further, in the reset management tables 114j and 114k illustrated in FIGS. 26A and 26B, the reset process target VMs are described using the corresponding VM names.

FIGS. 27A through 27F are examples of display screens guiding the respective reset ranges in example 3.

Namely, FIGS. 27A through 27F are examples of displays displaying the respective reset ranges displayed on the LCD 169 for a user in example 3. Herein, those examples displayed on the LCD 169 indicate the reset ranges obtained from the reset management table 114*j* illustrated in FIG. 26A in a case where the operation target VM is the guest VM (#1) 130*a*.

Figure 27A:
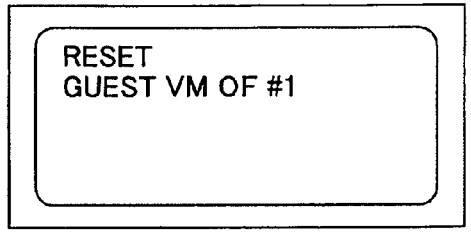
FIGS. 27A through 27F illustrate examples of display screens indicating the respective reset ranges according to the third embodiment of the present invention.
Figure 27B:
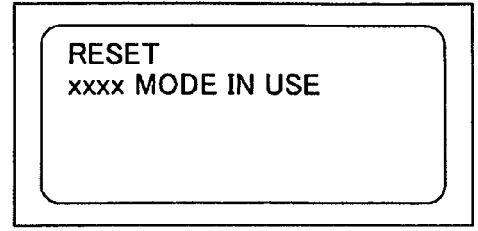
Figure 27C:
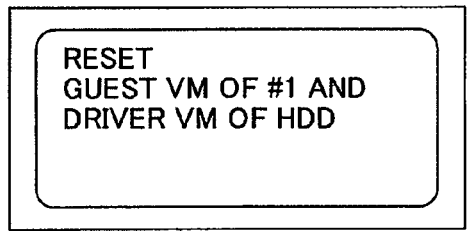
Figure 27D:
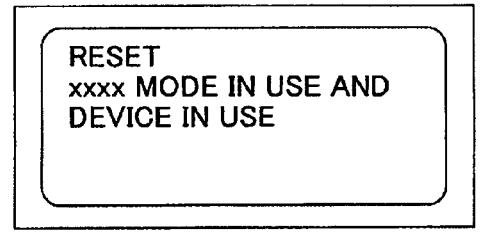
Figure 27E:
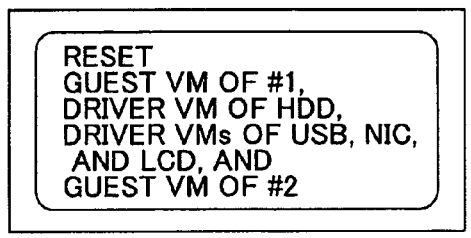
Figure 27F:
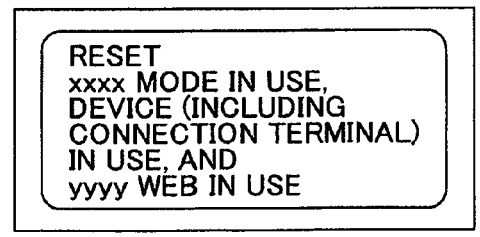

Specifically, FIG. 27A is an example of a display screen displaying the reset range using the VM name when the length (time period) of the pressing down operation of the reset button 161 by a user is "short". FIG. 27B is an example of a display screen displaying the reset range using a system name of the VM when the length (time period) of the pressing down operation of the reset button 161 by a user is "short". FIG. 27C is an example of a display screen displaying the reset range using the VM names when the length (time period) of the pressing down operation of the reset button 161 by a user is "middle". FIG. 27D is an example of a display screen displaying the reset range using the system names of the VMs when the length (time period) of the pressing down operation of the reset button 161 by a user is "middle". FIG. 27E is an example of a display screen displaying the reset range using the VM names when the length (time period) of the pressing down operation of the reset button 161 by a user is "long". FIG. 27F is an example of a display screen displaying the reset range using the system names of the VMs when the length (time period) of the pressing down operation of the reset button 161 by a user is "long".

In the following, a specific example of generating a reset range list performed by the reset range control section 113 in example 3 is described. Further, in the description below, the step numbers in parentheses denote the respective step numbers of the process in the flowchart illustrated in FIG. 17.

Herein, in the VM configuration illustrated in FIG. 24, it is assumed that the operation target VM is the guest VM (#1) 130*a*. Further, it is assumed that the reset management table 114 stored in the reset range control section 113 is generated based on the reset control policy (2) illustrated in FIG. 10B. Therefore, the reset management table 114 to be referred to by the reset range control section 113 is the reset management table 114*j* (see FIG. 26A) corresponding to a case where the operation target VM is the guest VM (#1) 130*a*.

First, a case is described where the length (time period) of the pressing down operation of the reset button 161 by a user is "short". As a result of the determination that the length of the pressing down operation of the reset button 161 by a user is "short", it is determined that the reset level instructed by the user is "1".

The reset range control section 113 obtains the VM-ID of the guest VM (#1) 130*a* that is the first reset process target VM in the reset level "1" from the reset management table 114*j*, and generates the reset range list (step S141).

The reset range control section 113 determines (confirms) that the data of the next reset process target VM in the reset level "1" is none (i.e., "null") in the reset management table 114*g* (NO in step S142).

The reset range control section 113 determines that the reset level instructed by the user is "1" (YES in step S143). At this point, the reset range list is completed. In the completed reset range list, only the guest VM (#1) 130*a* is recorded as the reset process target VM.

FIG. 27A is a screen example displaying the reset range using the VM name on the display of the LCD 169. On the other hand, FIG. 27B is a screen example displaying the reset range using the system name of the VM on the display of the LCD 169.

The reset range control section 113 reports the completed reset range list to the management VM 120 (step S149). The management VM 120 performs the reset process on the guest VM (#1) 130*a* recorded in the reset range list. Therefore, it may become possible to perform the reset process only on the guest VM (#1) 130*a*.

Next, a case is described where the length (time period) of the pressing down operation of the reset button 161 by a user is "middle". As a result of the determination that the length of the pressing down operation of the reset button 161 by a user is "middle", it is determined that the reset level instructed by the user is "2".

The processes up to the process of recording the reset process target VM of the reset level "1" into the reset range list (i.e., up to NO in step S142) are the same as those in the above case where the length of the pressing down operation of the reset button 161 by a user is "short". Therefore, the repeated description is herein omitted.

After the process of recording the reset process target VM of the reset level "1" into the reset range list (NO in step S142), the reset range control section 113 determines that the reset level instructed by the user is "2" (NO in step S143).

The reset range control section 113 obtains the VM-ID of the driver VM (HDD) 140*d* that is the first reset process target VM in the reset level "2" from the reset management table 114*j*, and adds the obtained VM-ID to the reset range list (step S144).

The reset range control section 113 determines that the data of the next reset process target VM in the reset level "2" is none (i.e., "null") in the reset management table 114*j* (NO in step S145).

The reset range control section 113 determines that the reset level instructed by the user is "2" (YES in step S146). At this point, the reset range list is completed. In the completed reset range list, the guest VM (#1) 130*a* and the driver VM (HDD) 140*d* are recorded as the reset process target VMs.

FIG. 27C is a screen example displaying the reset range using the VM names on the display of the LCD 169. On the other hand, FIG. 27D is a screen example displaying the reset range using the system name of the VM on the display of the LCD 169.

The reset range control section 113 reports the completed reset range list to the management VM 120 (step S149). The management VM 120 performs the reset process on the guest VM (#1) 130*a* and the driver VM (HDD) 140*d* recorded in the reset range list. Therefore, it may become possible to perform the reset process only on the guest VM (#1) 130*a* and the driver VM (HDD) 140*d*.

Next, a case is described where the length (time period) of the pressing down operation of the reset button 161 by a user is "long". As a result of the determination that the length of the pressing down operation of the reset button 161 by a user is "long", it is determined that the reset level instructed by the user is "3".

The processes up to the process of recording the reset process target VMs of the reset level "2" into the reset range list (i.e., up to NO in step S145) are the same as those in the above case where the length of the pressing down operation of the reset button 161 by a user is "middle". Therefore, the repeated description is herein omitted.

After the process of recording the reset process target VM of the reset level "2" into the reset range list (NO in step S145), the reset range control section 113 determines that the reset level instructed by the user is "3" (NO in step S146).

The reset range control section 113 obtains the VM-ID of the driver VM (USB) 140*c* that is the first reset process target VM in the reset level "3" from the reset management table 114*j*, and adds the obtained VM-ID to the reset range list (step S147).

The reset range control section 113 obtains the VM-ID of the driver VM (NIC) 140*b* that is the next reset process target VM in the reset level "3" from the reset management table 114*j*, and adds the obtained VM-ID to the reset range list (step S147).

The reset range control section 113 obtains the VM-ID of the driver VM (LCD) 140*a* that is the next reset process target VM in the reset level "3" from the reset management table 114*j*, and adds the obtained VM-ID to the reset range list (step S147).

The reset range control section 113 obtains the VM-ID of the guest VM (#2) 130*b* that is the next reset process target VM in the reset level "3" from the reset management table 114*j*, and adds the obtained VM-ID to the reset range list (step S147).

The reset range control section 113 determines that the data of the next reset process target VM in the reset level "3" is none (i.e., "null") in the reset management table 114*j* (NO in step S145). At this point, the reset range list is completed. In the completed reset range list, the guest VM (#1) 130*a*, the driver VM (HDD) 140*d*, the driver VM (USB) 140*c*, the driver VM (NIC) 140*b*, the driver VM (LCD) 140*a*, and the guest VM (#2) 130*b* are recorded as the reset process target VMs.

FIG. 27E is a screen example displaying the reset range using the VM names on the display of the LCD 169. On the other hand, FIG. 27F is a screen example displaying the reset range using the system name of the VM on the display of the LCD 169.

The reset range control section 113 reports the completed reset range list to the management VM 120 (step S149). The management VM 120 performs the reset process on the guest VM (#1) 130*a*, the driver VM (HDD) 140*d*, the driver VM (USB) 140*c*, the driver VM (NIC) 140*b*, the driver VM (LCD) 140*a*, and the guest VM (#2) 130*b* recorded in the reset range list. Therefore, it may become possible to perform the reset process only on the guest VM (#1) 130*a*, the driver VM (HDD) 140*d*, the driver VM (USB) 140*c*, the driver VM (NIC) 140*b*, the driver VM (LCD) 140*a*, and the guest VM (#2) 130*b*.

Example 4

In example 4, a case is described where there are three guest VMs 130 and several driver VMs 140 that are used by the guest VMs 130 with reference to FIGS. 28 through 31. It should be noted that in the VM configuration of example 4 there are driver VMs 140 that are shared by the guest VMs 130.

Figure 28:
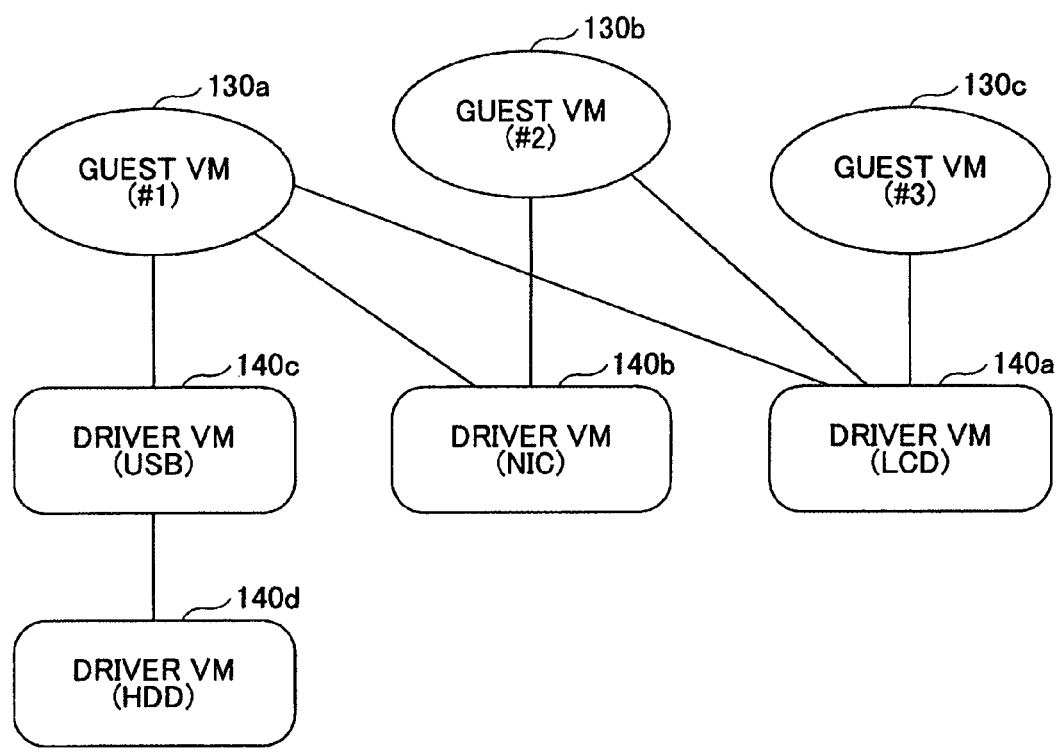
FIG. 28 illustrates an example configuration of the VMs according to a fourth embodiment of the present invention.

FIG. 28 is an example configuration of the VMs (VM configuration) of example 4.

As schematically illustrated in the VM configuration illustrated in FIG. 28, the guest VM (#1) 130*a* is connected to the LCD 169 and NIC 168 via the driver VM (LCD) 140*a* and the driver VM (NIC) 140*b*, respectively. Further, the guest VM (#1) 130*a* is connected to the HDD 164 via the driver VM (USB) 140*c* and the driver VM (HDD) 140*d*, the driver VM (USB) 140*c* being the driver for the USB connection terminal 163.

Further, the guest VM (#2) 130*b* is connected to the LCD 169 and NIC 168 via the driver VM (LCD) 140*a* and the driver VM (NIC) 140*b*, respectively.

Further, the guest VM (#3) 130*c* is connected to the LCD 169 via the driver VM (LCD) 140*a*.

In the VM configuration illustrated in FIG. 28, the driver VM (LCD) 140*a* is shared by the guest VM (#1) 130*a*, the guest VM (#2) 130*b*, and the guest VM (#3) 130*c*. Further, the driver VM (NIC) 140*b* is shared by the guest VM (#1) 130*a* and the guest VM (#2) 130*b*.

FIGS. 29A through 29C are examples of the reset management tables (1) 114*l* through 114*n* of example 4.

The reset management tables 114*l* through 114*n* illustrated in FIGS. 29A through 29C are generated based on the dependency relationships and the order relationships in the VM configuration illustrated in FIG. 28 and based on the reset control policy (1) illustrated in FIG. 10A. In the reset management table 114*l* illustrated in FIG. 29A, the operation target VM is the guest VM (#1) 130*a*. Further, in the reset management table 114*m* illustrated in FIG. 29B, the operation target VM is the guest VM (#2) 130*b*. Further, in the reset management table 114*n* illustrated in FIG. 29C, the operation target VM is the guest VM (#3) 130*c*. Further, in the reset management tables 114*l* through 114*n* illustrated in FIGS. 29A through 29C, the reset process target VMs are described using the corresponding VM names.

FIGS. 30A through 30C are examples of the reset management tables (2) 114*o* through 114*q* of example 4.

The reset management tables 114*o* through 114*q* illustrated in FIGS. 30A through 30C are generated based on the dependency relationships and the order relationships in the VM configuration illustrated in FIG. 28 and based on the reset control policy (2) illustrated in FIG. 10B. In the reset management table 114*o* illustrated in FIG. 30A, the operation target VM is the guest VM (#1) 130*a*. Further, in the reset management table 114*p* illustrated in FIG. 30B, the operation target VM is the guest VM (#2) 130*b*. Further, in the reset management table 114*q* illustrated in FIG. 30C, the operation target VM is the guest VM (#3) 130*c*. Further, in the reset management tables 114*o* through 114*q* illustrated in FIGS. 30A through 30C, the reset process target VMs are described using the corresponding VM names.

FIGS. 31A through 31F are examples of display screens guiding the respective reset range in example 4.

Namely, FIGS. 31A through 31F are examples of displays displaying the respective reset ranges displayed on LCD 169 for a user in example 4. Herein, those examples displayed on the LCD 169 indicate the reset ranges obtained from the reset management table 114*o* illustrated in FIG. 30A in a case where the operation target VM is the guest VM (#1) 130*a*.

Figure 31A:
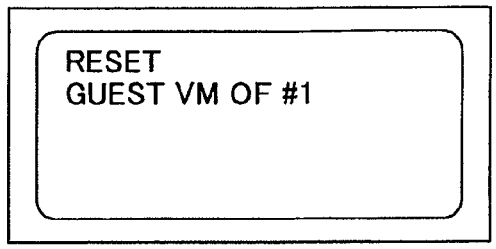
FIGS. 31A through 31F illustrate examples of display screens indicating the respective reset ranges according to the forth embodiment of the present invention.
Figure 31B:
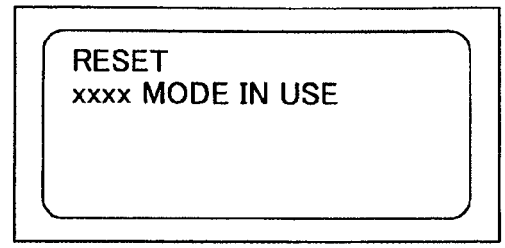
Figure 31C:
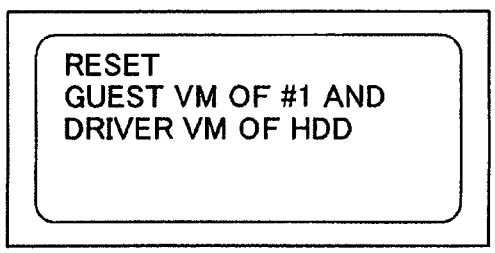
Figure 31D:
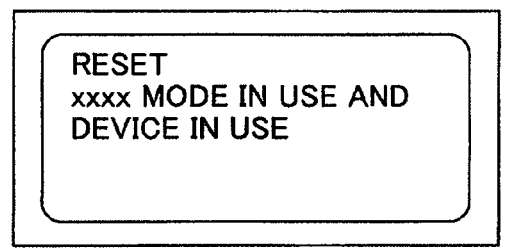
Figure 31E:
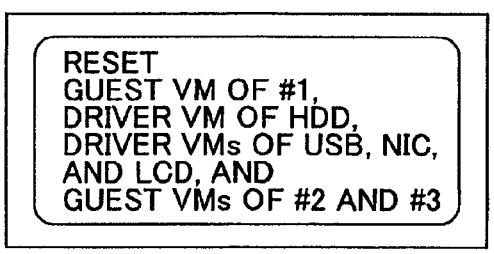
Figure 31F:
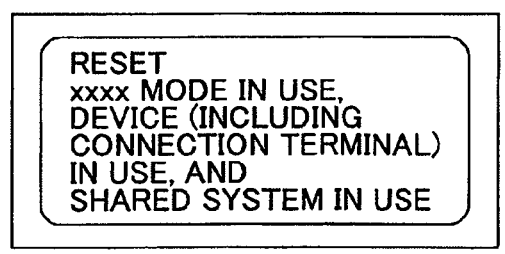

Specifically, FIG. 31A is an example of a display screen displaying the reset range using the VM name when the length (time period) of the pressing down operation of the reset button 161 by a user is "short". FIG. 31B is an example of a display screen displaying the reset range using a system name of the VM when the length (time period) of the pressing down operation of the reset button 161 by a user is "short". FIG. 31C is an example of a display screen displaying the reset range using the VM names when the length (time period) of the pressing down operation of the reset button 161 by a user is "middle". FIG. 31D is an example of a display screen displaying the reset range using the system names of the VMs when the length (time period) of the pressing down operation of the reset button 161 by a user is "middle". FIG. 31E is an example of a display screen displaying the reset range using the VM names when the length (time period) of the pressing down operation of the reset button 161 by a user is "long". FIG. 31F is an example of a display screen displaying the reset range using the system names of the VMs when the length (time period) of the pressing down operation of the reset button 161 by a user is "long".

In the following, a specific example of generating a reset range list performed by the reset range control section 113 in example 4 is described. Further, in the description below, the step numbers in parentheses denote the respective step numbers of the process in the flowchart illustrated in FIG. 17.

Herein, in the VM configuration illustrated in FIG. 28, it is assumed that the operation target VM is the guest VM (#1) 130a. Further, it is assumed that the reset management table 114 stored in the reset range control section 113 is generated based on the reset control policy (2) illustrated in FIG. 10B. Therefore, the reset management table 114 to be referred to by the reset range control section 113 is the reset management table 114o (see FIG. 30A) corresponding to a case where the operation target VM is the guest VM (#1) 130a.

First, a case is described where the length (time period) of the pressing down operation of the reset button 161 by a user is "short". As a result of the determination that the length of the pressing down operation of the reset button 161 by a user is "short", it is determined that the reset level instructed by the user is "1".

The reset range control section 113 obtains the VM-ID of the guest VM (#1) 130a that is the first reset process target VM in the reset level "1" from the reset management table 114o, and generates the reset range list (step S141).

The reset range control section 113 determines (confirms) that the data of the next reset process target VM in the reset level "1" is none (i.e., "null") in the reset management table 114o (NO in step S142).

The reset range control section 113 determines that the reset level instructed by the user is "1" (YES in step S143). At this point, the reset range list is completed. In the completed reset range list, only the guest VM (#1) 130a is recorded as the reset process target VM.

FIG. 31A is a screen example displaying the reset range using the VM name on the display of the LCD 169. On the other hand, FIG. 31B is a screen example displaying the reset range using the system name of the VM on the display of the LCD 169.

The reset range control section 113 reports the completed reset range list to the management VM 120 (step S149). The management VM 120 performs the reset process on the guest VM (#1) 130a recorded in the reset range list. Therefore, it may become possible to perform the reset process only on the guest VM (#1) 130a.

Next, a case is described where the length (time period) of the pressing down operation of the reset button 161 by a user is "middle". As a result of the determination that the length of the pressing down operation of the reset button 161 by a user is "middle", it is determined that the reset level instructed by the user is "2".

The processes up to the process of recording the reset process target VM of the reset level "1" into the reset range list (i.e., up to NO in step S142) are the same as those in the above case where the length of the pressing down operation of the reset button 161 by a user is "short". Therefore, the repeated description is herein omitted.

After the process of recording the reset process target VM of the reset level "1" into the reset range list (NO in step S142), the reset range control section 113 determines that the reset level instructed by the user is "2" (NO in step S143).

The reset range control section 113 obtains the VM-ID of the driver VM (HDD) 140d that is the first reset process target VM in the reset level "2" from the reset management table 114o, and adds the obtained VM-ID to the reset range list (step S144).

The reset range control section 113 determines that the data of the next reset process target VM in the reset level "2" is none (i.e., "null") in the reset management table 114j (NO in step S145).

The reset range control section 113 determines that the reset level instructed by the user is "2" (YES in step S146). At this point, the reset range list is completed. In the completed reset range list, the guest VM (#1) 130a and the driver VM (HDD) 140d are recorded as the reset process target VMs.

FIG. 31C is a screen example displaying the reset range using the VM names on the display of the LCD 169. On the other hand, FIG. 31D is a screen example displaying the reset range using the system name of the VM on the display of the LCD 169.

The reset range control section 113 reports the completed reset range list to the management VM 120 (step S149). The management VM 120 performs the reset process on the guest VM (#1) 130a and the driver VM (HDD) 140d recorded in the reset range list. Therefore, it may become possible to perform the reset process only on the guest VM (#1) 130a and the driver VM (HDD) 140d.

Next, a case is described where the length (time period) of the pressing down operation of the reset button 161 by a user is "long". As a result of the determination that the length of the pressing down operation of the reset button 161 by a user is "long", it is determined that the reset level instructed by the user is "3".

The processes up to the process of recording the reset process target VMs of the reset level "2" into the reset range list (i.e., up to NO in step S145) are the same as those in the above case where the length of the pressing down operation of the reset button 161 by a user is "middle". Therefore, the repeated description is herein omitted.

After the process of recording the reset process target VM of the reset level "2" into the reset range list (NO in step S145), the reset range control section 113 determines that the reset level instructed by the user is "3" (NO in step S146).

The reset range control section 113 obtains the VM-ID of the driver VM (USB) 140c that is the first reset process target VM in the reset level "3" from the reset management table 114o, and adds the obtained VM-ID to the reset range list (step S147).

The reset range control section 113 obtains the VM-ID of the driver VM (NIC) 140b that is the next reset process target VM in the reset level "3" from the reset management table 114o, and adds the obtained VM-ID to the reset range list (step S147).

The reset range control section 113 obtains the VM-ID of the driver VM (LCD) 140a that is the next reset process target VM in the reset level "3" from the reset management table 114o, and adds the obtained VM-ID to the reset range list (step S147).

The reset range control section 113 obtains the VM-ID of the guest VM (#2) 130b that is the next reset process target VM in the reset level "3" from the reset management table 114o, and adds the obtained VM-ID to the reset range list (step S147).

The reset range control section 113 obtains the VM-ID of the guest VM (#3) 130c that is the next reset process target VM in the reset level "3" from the reset management table 114o, and adds the obtained VM-ID to the reset range list (step S147).

The reset range control section 113 determines that the data of the next reset process target VM in the reset level "3" is none (i.e., "null") in the reset management table 114o (NO in step S145). At this point, the reset range list is completed. In the completed reset range list, the guest VM (#1) 130a, the driver VM (HDD) 140d, the driver VM (USB) 140c, the driver VM (NIC) 140b, the driver VM (LCD) 140a, the guest VM (#2) 130b, and the guest VM (#3) 130c are recorded as the reset process target VMs.

FIG. 31E is a screen example displaying the reset range using the VM names on the display of the LCD 169. On the other hand, FIG. 31F is a screen example displaying the reset range using the system name of the VM on the display of the LCD 169. Further, the "shared system" on the screen display may be designated by a user so that the a list of the driver VMs 140 having the operation target VM and the guest VMs 130 sharing the driver VM 140 may be displayed.

The reset range control section 113 reports the completed reset range list to the management VM 120 (step S149). The management VM 120 performs the reset process on the guest VM (#1) 130*a*, the driver VM (HDD) 140*d*, the driver VM (USB) 140*c*, the driver VM (NIC) 140*b*, the driver VM (LCD) 140*a*, the guest VM (#2) 130*b*, and the guest VM (#3) 130*c* recorded in the reset range list. Therefore, it may become possible to perform the reset process only on the guest VM (#1) 130*a*, the driver VM (HDD) 140*d*, the driver VM (USB) 140*c*, the driver VM (NIC) 140*b*, the driver VM (LCD) 140*a*, the guest VM (#2) 130*b*, and the guest VM (#3) 130*c*.

In the above-described computer system 1 (or the mobile terminal 100) according to an embodiment of the present invention, it may become possible to perform reset control only on a limited range of the VMs. Further, in this case, by using the reset management information 19 (or the reset management table 114) provided based on the dependency relationships between the VMs and the like, it may become possible to perform the reset control on the VMs in the reset ranges corresponding to the levels (stages) of the reset operation. By using this feature, it may become possible for even a general user not having sufficient knowledge of the virtualization techniques to designate the reset range of the VMs to be reset with a simple operation.

Namely, by using a technique described above, in a computer system employing the virtualization techniques, it may become easier to limit a range of the virtual machines (VMs) that are to be reset or perform the reset control. Therefore, by using the technique, when a failure occurs in the computer system, it may become possible to limit a range of the virtual machines relevant to the failure and perform the reset process only on the limited range of the virtual machines which are relevant to the failure without interrupting or cancelling the applications used by the virtual machines other than the virtual machines in the limited range.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present inventions has been described in detail, it is to be understood that various changes, substitutions, and alterations could be made hereto without departing from the spirit and scope of the invention.

In the above embodiment, a case is described where the number of reset levels corresponding to the reset operation is "3". However, the present invention is not limited to the configuration where the number of reset levels is "3". For example, the number of the reset levels may be four or five.

Further, in the above embodiment, a case is described where the operation to instruct the reset process is performed by a pressing down operation of the reset button 161, and the reset level is determined depending on the length (time period) of the pressing down operation of the reset button 161 by a user. However, the present invention is not limited to this configuration. For example, a pressure sensor may be placed on the part of the reset button 161 of the mobile terminal 100, so that the reset level may be determined depending on the detected amount of the pressure caused by the pressing down operation of the reset button 161. Further, for example, the operation performed by the user to instruct the reset operation may be the pressing down operation of the power button 162, so that the reset level may be determined depending on the length (time period) of the pressing down operation of the power button 162 by the user. Further, for example, an acceleration sensor may be placed in the mobile terminal 100 and the operation performed by the user to instruct the reset operation may be the operation of shaking the mobile terminal 100, so that the reset level may be determined depending on how many times the user shakes the mobile terminal 100. Further, for example, different reset levels may be assigned to different various keys 167 of the mobile terminal 100, so that the reset level may be determined depending on which of the various keys 167 is pressed by the user. Further, for example, the reset range may be designated on an operations menu of a touch screen.

Further, in the above embodiment, a case is described where the function of the reset control is implemented in the dependent reset control VM 10 (or 110). However, the present invention is not limited to this configuration. For example, the function of the reset control may be implemented in the management VM 20 (or 120).

What is claimed is:

1. A computer system having a virtual computer management mechanism realizing a virtual computer, the computer system comprising:
   a user virtual computer that communicates with a device via a virtual computer for a device driver under a control of the virtual computer management mechanism;
   an input receiving unit that receives a signal of an input operation from the device;
   a reset level determination unit that determines a reset level based on the received signal of the input operation;
   a reset target specifying unit that specifies a virtual computer to be a target of a reset process based on the determined reset level; and
   a reset signal transmission unit that transmits a reset signal to perform the reset process on the specified virtual computer, wherein
   the reset level is determined from among a plurality of reset levels, each reset level indicating a different number of virtual computers on which the reset process is to be performed, and
   the plurality of reset levels are contained in a reset management table of the computer system, the reset management table including arrangement information of data indicating virtual computers on which the reset process is to be performed.

2. The computer system according to claim 1, further comprising:
   an operation target specifying unit that specifies the user virtual computer to be an operation target of the received signal of the input operation; and
   a reset management information storage unit that stores reset management information including identification information of the virtual computer to be the target of the reset process, the virtual computer corresponding to the user virtual computer to be an operation target and the reset level,
   wherein for the user virtual computer specified by the operation target specifying unit, the reset target specifying unit refers to the reset management information stored in the reset management information storage unit, and obtains identification information of the virtual computer from the reset management information, the virtual computer corresponding to the reset level determined by the reset level determination unit, so that the reset target specifying unit specifies the virtual computer indicated by the obtained identification information as the virtual computer to be the target of the reset process.

3. The computer system according to claim 1, wherein the plurality of reset levels are hierarchically arranged, such that a reset level of a higher order includes an indication that at least all of the virtual computers indicated by a next lower order reset level are included in the higher order reset level.

4. The computer system according to claim 1, wherein the plurality of reset levels includes at least a first reset level and a second reset level, a number of virtual computers on which the reset process is to be performed as indicated by the first reset level being less than a number of virtual computers on which the reset process is to be performed as indicated by the second reset level.

5. The computer system according to claim 4, wherein the first reset level indicates that the reset process is to be performed only on the specified virtual computer and the second reset level indicates that the reset process is to be performed on the specified virtual computer and all other virtual computers having a direct dependency relationship with the specified virtual computer.

6. The computer system according to claim 5, wherein when a failure occurs in the computer system, the second reset level is determined as the rest level.

7. The computer system according to claim 1, wherein the reset level determination determines the reset level based on a time duration of the input operation.

8. The computer system according to claim 7, wherein the input receiving unit is a reset button and the time duration of the input operation is a length of time that the reset button is pressed.

9. A non-transitory computer-readable recording medium comprising a program to cause a computer of a computer system having a virtual computer management mechanism realizing a virtual computer to execute a method comprising:
operating a user virtual computer communicating with a device via a virtual computer for a device driver under a control of the virtual computer management mechanism;
receiving a signal of an input operation from the device;
determining a reset level based on the received signal of the input operation;
specifying a virtual computer to be a target of a reset process based on the determined reset level; and
transmitting a reset signal to perform the reset process on the specified virtual computer, wherein
the reset level is determined from among a plurality of reset levels, each reset level indicating a different number of virtual computers on which the reset process is to be performed, and
the plurality of reset levels are contained in a reset management table of the computer system, the reset management table including arrangement information of data indicating virtual computers on which the reset process is to be performed.

10. The non-transitory computer-readable recording medium according to claim 9, wherein the plurality of reset levels are hierarchically arranged, such that a reset level of a higher order includes an indication that at least all of the virtual computers indicated by a next lower order reset level are included in the higher order reset level.

11. The non-transitory computer-readable recording medium according to claim 9, wherein the plurality of reset levels includes at least a first reset level and a second reset level, a number of virtual computers on which the reset process is to be performed as indicated by the first reset level being less than a number of virtual computers on which the reset process is to be performed as indicated by the second reset level.

12. The non-transitory computer-readable recording medium according to claim 11, wherein the first reset level indicates that the reset process is to be performed only on the specified virtual computer and the second reset level indicates that the reset process is to be performed on the specified virtual computer and all other virtual computers having a direct dependency relationship with the specified virtual computer.

13. The non-transitory computer-readable recording medium according to claim 12, wherein when a failure occurs in the computer system, the second reset level is determined as the rest level.

14. The non-transitory computer-readable recording medium according to claim 9, determining the reset level is based on a time duration of the input operation.

15. The non-transitory computer-readable recording medium according to claim 14, wherein the computer system includes s reset button and the time duration of the input operation is a length of time that the reset button is pressed.

* * * * *

UNITED STATES PATENT AND TRADEMARK OFFICE
CERTIFICATE OF CORRECTION

| | | |
|---|---|---|
| PATENT NO. | : 8,745,619 B2 | Page 1 of 1 |
| APPLICATION NO. | : 13/064660 | |
| DATED | : June 3, 2014 | |
| INVENTOR(S) | : Fujisaki et al. | |

It is certified that error appears in the above-identified patent and that said Letters Patent is hereby corrected as shown below:

In the Claims

Column 40, Line 43, Claim 15, delete "s reset" and insert -- a reset --, therefor.

Signed and Sealed this
Twenty-third Day of September, 2014

Michelle K. Lee
*Deputy Director of the United States Patent and Trademark Office*